United States Patent
Shanmugam et al.

(10) Patent No.: US 10,306,705 B2
(45) Date of Patent: May 28, 2019

(54) SECURE CONNECTED DEVICE CONTROL AND MONITORING SYSTEM

(71) Applicant: Verizon Patent and Licensing Inc., Arlington, VA (US)

(72) Inventors: Sankar Shanmugam, Dayton, NJ (US); Arindam Mitra, Duluth, GA (US); Maheswaran Krishnan, Woodbridge, NJ (US); Moorthy Sengottaiyan, Somerset, NJ (US); Sivagnanalingam Sivaganesh, Belle Mead, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 112 days.

(21) Appl. No.: 14/564,885

(22) Filed: Dec. 9, 2014

(65) Prior Publication Data

US 2016/0165663 A1    Jun. 9, 2016

(51) Int. Cl.
| | |
|---|---|
| H04W 8/10 | (2009.01) |
| H04W 76/10 | (2018.01) |
| H04W 76/11 | (2018.01) |
| H04W 76/12 | (2018.01) |
| H04W 84/12 | (2009.01) |

(52) U.S. Cl.
CPC ............ *H04W 84/12* (2013.01); *H04W 8/10* (2013.01); *H04W 76/10* (2018.02); *H04W 76/12* (2018.02); *H04W 76/11* (2018.02)

(58) Field of Classification Search
CPC .............................. H04W 88/16; H04W 84/12
USPC .......................................................... 370/338
See application file for complete search history.

(56) References Cited

U.S. PATENT DOCUMENTS

| | | | | |
|---|---|---|---|---|
| 8,378,779 | B2 * | 2/2013 | Maegawa | G05B 15/02 340/3.1 |
| 2004/0143738 | A1 * | 7/2004 | Savage | G06Q 20/383 713/168 |
| 2009/0259746 | A1 * | 10/2009 | Sasaki | H04W 24/08 709/224 |
| 2011/0205050 | A1 * | 8/2011 | Pineau | G08B 25/14 340/506 |
| 2013/0089001 | A1 * | 4/2013 | Dattagupta | H04W 48/20 370/255 |
| 2013/0111572 | A1 | 5/2013 | Gaddam et al. | |
| 2013/0117382 | A1 | 5/2013 | Gaddam et al. | |

(Continued)

*Primary Examiner* — Peter G Solinsky

(57) ABSTRACT

Examples are disclosed that facilitate connecting in a secure and efficient manner a mobile device to networked-enabled devices located in a premises. The security of the networked-enabled, connected devices in the premises may be maintained by use of a gateway device situated behind a home router. Through the home router, the gateway device maintains a persistent connection with a network component of a service provider. When an authorized application executing on a mobile device attempts to connect with the gateway device to communicate with the respective customer connected devices, the device control application is connected to a pre-established communication port to allow direct communication between the device control application and the respective customer connected device. A service provider's network component in some examples maintains the pre-established connection for the duration of the session in which the customer connected device is to be controlled via a mobile device, or longer.

20 Claims, 10 Drawing Sheets

(56) References Cited

U.S. PATENT DOCUMENTS

| | | | |
|---|---|---|---|
| 2014/0194097 A1 | 7/2014 | Gaddam et al. | |
| 2014/0215062 A1 | 7/2014 | Anugu | |
| 2015/0067762 A1* | 3/2015 | Belenky | H04L 63/0263 726/1 |
| 2015/0163168 A1* | 6/2015 | Nakamura | H04L 49/25 709/204 |
| 2015/0281122 A1* | 10/2015 | Hoffman | H04L 47/806 709/203 |
| 2015/0350912 A1* | 12/2015 | Head | H04W 12/08 726/4 |
| 2015/0373607 A1* | 12/2015 | Zhu | H04W 36/22 370/331 |
| 2016/0055422 A1* | 2/2016 | Li | G05B 13/00 706/12 |
| 2016/0142402 A1* | 5/2016 | Kim | H04L 63/08 726/4 |

\* cited by examiner

100

200

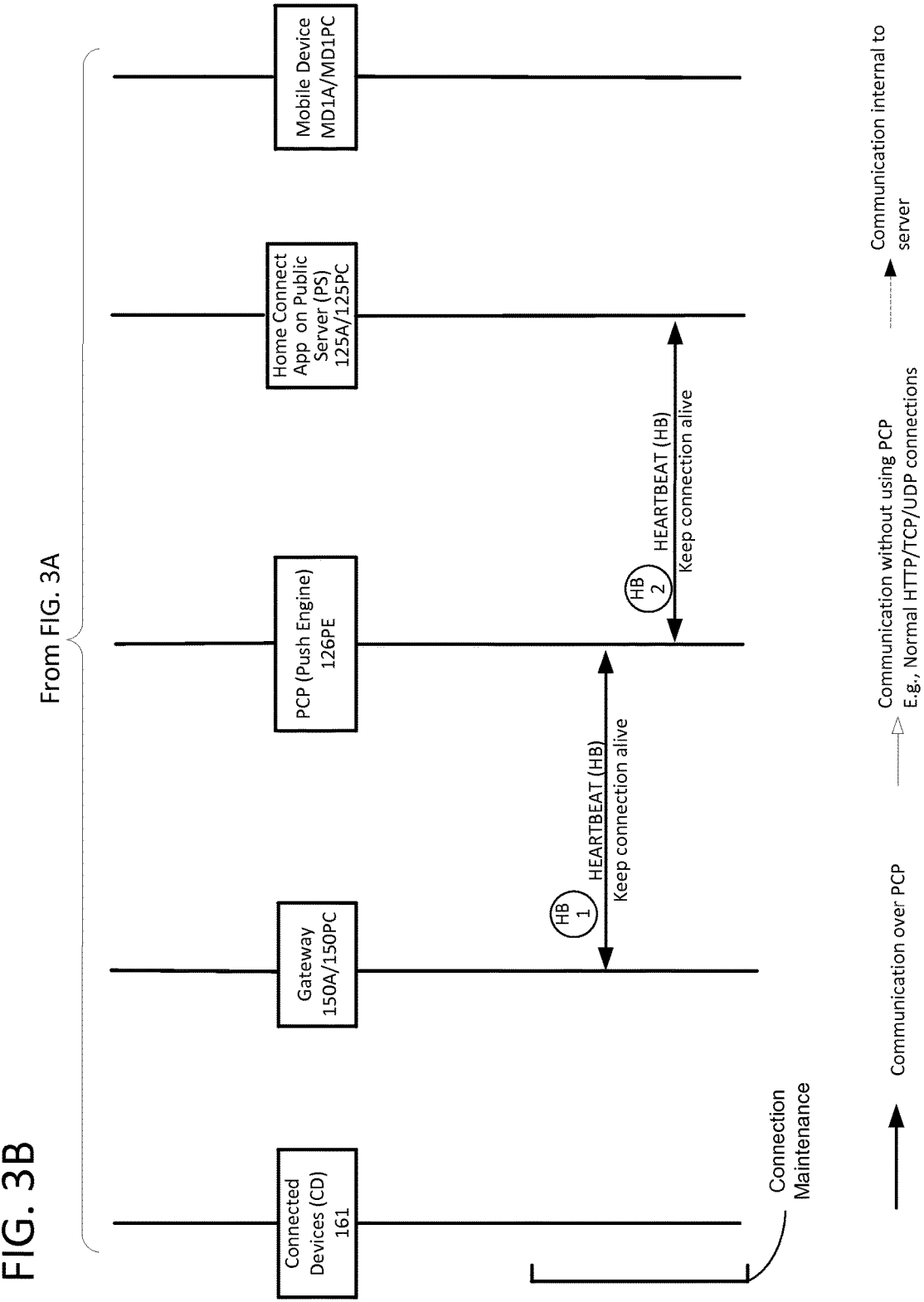

SECURE CONNECTED DEVICE CONTROL AND MONITORING SYSTEM

BACKGROUND

The increased availability of customer connected home or business use appliances has led to a proliferation of a variety of personal or home automation systems. Such systems allow customers to remotely control various systems both from within and from outside their homes or businesses via their portable or wearable smart mobile devices using Bluetooth, Wi-Fi, broadband Internet and cellular telephone networks. Examples of controllable functions include managing a home security system, controlling energy consumption within a premises by managing heating and lighting, accessing home media and entertainment (both across a user's home and in the user's automobile), monitoring vital parameters (e.g., heart rate, blood sugar) and providing timely information to life support systems, tracking children's whereabouts, and the like.

Multiple, off-the-shelf, customer connected home or business premises-based devices can be easily connected to the cellular, Bluetooth or Wi-Fi networks and controlled via an application/controller program that resides on a smartphone or other type of portable or wearable device. However, such "plug and play" systems pose at least two problems to the user. First, the user may be confused by being exposed to an unstructured and fragmented electronics ecosystem that has been created due to an ever growing choice of add-on devices coupled with evolving networking standards (e.g., Zigbee, Zwave, X10 and the like). In other words, the different customer connected devices do not comply with a single standard or a compatible communication protocol, and therefore, the connected devices do not interact well with one another. Secondly, many in home devices manufactured by different manufacturers require different applications on the user's mobile device; and those applications offer distinctly different user interfaces. Also, smartphone and wearable device applications developed by third party vendors may not be completely compatible with all connected devices or with each other, resulting in sub-par performance. For example, older computing devices may have operating systems that are out-of-date or even incompatible with operating systems of other devices. As a result, devices of the same manufacturer may not effectively communicate or interact with one another due to the incompatibility of the respective device operating systems or other compatibility issues, such as communication protocol differences. Even a broad-based, consolidated system may restrict the kind of devices that can be activated within an ecosystem.

Aside from the interoperability issues, there is yet another issue associated with multiple customer connected devices related to accessing a user's home network, such as a Wi-Fi network. Presently, the above referenced customer connected devices in a customer's home/Wi-Fi network are behind a router; and securely, be accessing in-home from a mobile device external to the home/Wi-Fi network represents a complex challenge. Each customer connected device has to be individually configured to connect to mobile applications and vice versa. If users want to connect multiple devices to their home/Wi-Fi network, each connected device has to maintain a separate connection with the outside network. Moreover, mobile devices outside the home/Wi-Fi network cannot initiate communication with the enabled customer connected devices inside the home/Wi-Fi network without manually configuring the router of the home network. Without assistance, the management of disparate devices that use differing communication standards eventually translates into a poor user/customer experience.

As a result, there is a need for improvement in managing disparate devices that are implemented behind a router of a premises local area network, such as a Wi-Fi network.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIGS. 3A and 3B are a signal flow diagrams illustrating an example of the signal flows among home connection logical layer and persistent connection logical layer elements through a persistent connection platform in the service provider network.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

In order to overcome the obstacles to easily managing and communicating with disparate home automation components, examples of the disclosed systems provide a combination of customer connected devices that interact with a gateway device that facilitates communicating with the home automation components behind the user's home network. The gateway device provides a seamless plug-n-play environment that offers users (e.g., mobile communication network operator customers/subscribers) the option of using devices of their choice and interactive capabilities as described in more detail with reference to FIG. 1.

Figure 1:
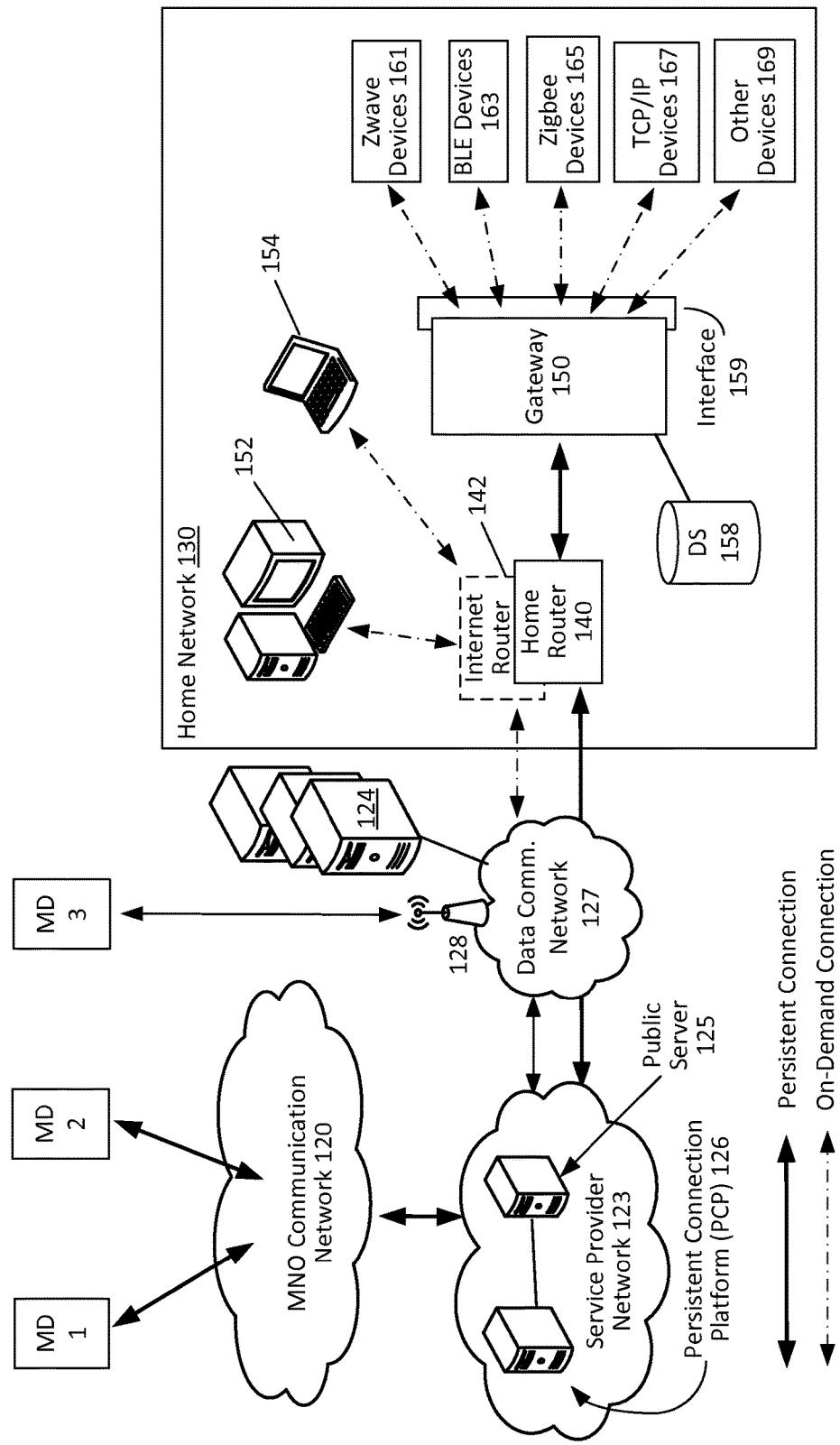
FIG. 1 is a high-level functional block diagram of an example of a system for providing remote access to connectable devices within a customer premises network (e.g., in a home or business).

FIG. 1 illustrates a high-level functional block diagram of a system configured according to an example of the disclosed subject matter. In the example, the system 100 includes a service provider network 123 and a home network 130 as well as a mobile network operator (MNO) communication network 120, mobile devices MD1-MD3, and a data communication network 127, such as the Internet or a business intranet.

As discussed herein, the service provider using the service provider network provides a customer connected device control service that allows service subscribers to control their customer connected devices in a premises, such as the subscriber's home or business, from remote locations using a mobile device, such as a smartphone, laptop, tablet, wearable device, or any other suitable device. Examples of a wearable device include a watch, fitness device, personal digital assistant, or the like. As part of the service, the remote mobile device is configured to execute computer program instructions of a customer connected device control application (i.e., a home connect application). The customer connected device control application, also referred to as the home connect application, is implemented in modules that execute on the gateway 150, the mobile devices MD1-MD3, and the public server 125. Note that the public server 125 may be any publicly accessible server. In the present example, the public server 125 is a service provider server that is publicly accessible from external networks, such as the internet 127.

The gateway 150 in a customer's home network 130 connects to multiple connected devices 161-169. The gateway 150 shares the information about the connected devices 161-169 with the instances of the customer connected device control application executing on the public server 125 and the customer's mobile devices MD1-MD3 via the PCP 126 and the mobile communication network 120. In turn, this enables the customer to communicate with the connected devices 161-169 from their respective mobile devices MD1-MD3. For example, when sending a message to a connected device (e.g., 163) from mobile device MD1, the mobile device MD1 contacts via the PCP 126 the gateway 150 connected to the respective connected device (e.g., 163), and the gateway 150 relays the message to the connected device 163. Similarly, the connected device 163 is configured to send a message (e.g., a notification or an alert) to a mobile device, such as MD1 through the gateway 150, which relays the message to the PCP 126 that delivers the message to the mobile device MD1. Of course, any of mobile devices MD1-MD3 may be send messages to the gateway 150 and receive messages from the gateway 150.

The service provider network 123, among other functions, is configured to facilitate communication between mobile devices, such as MD1-MD3, and the customer connected devices 161-169 within the home network. For example, a customer connected device control system service provided by the service provider includes allowing a customer (i.e., a service subscriber) to use the service provider network 123 resources to securely connect to the subscriber's home network (e.g., home network 130) and access, via the home router 140 and gateway 150, the customer connected devices 161-169. Using the service to access the customer connected devices 161-169, the user/customer through a customer connected device control application (i.e., a home connect application) on the mobile device is able to obtain data from devices 161-169, send control commands to the customer connected devices 161-169, exchange status information (e.g., device is ON/OFF, functioning properly, notifications (e.g., door has opened, a switch has switched to the ON position)), or other information. The control commands sent by the customer connected device control application on the mobile device may be in a communication protocol format different from the customer connected devices 161-169. In such an example, the gateway 150 (i.e., a home network device) receives the control command from the device control application. As mentioned, the control command includes instructions directed to a particular one of the customer connected devices, but is in a communication protocol format (e.g., Zwave) different from the received instructions (e.g., TCP/IP). The gateway 150 is configured to translate the received instructions in the control command into a communication protocol format of the connected, customer connected device. The gateway 150 establishes a connection with the customer connected device and delivers the translated instructions to the customer connected device for execution of the instructions. In an alternate example, the multi-protocol communication interface 159 of the gateway 150 is configured to receive and decode signals formatted in various communication protocols received from the customer connected device and encode and transmit signals to the customer connected device. For example, the multi-protocol communication interface 159 is configured to recognize signals of various communication protocols, such as Zigbee, X10, TCP/IP and the like, received from connected devices. The multi-protocol communication interface 159, for example, indicates to the gateway 150 the communication protocol of the received signal, which allows the gateway to decode and process the received signals.

In the presented examples, a service provider is an entity that maintains the PCP 126 and public server 125 in the service provider network 123. The service provider (not shown) also maintains a database of customer connected device profile information transmitted to the PCP 126 for each gateway device 150. In addition, the service provider provides a device control application suitable for use with the gateway device 150, the customer connected devices 161-169, and the PCP 126. The service provider may be a mobile (i.e., cellular) network operator that provides a customer connected device control service in combination with also providing mobile communication (i.e., cellular) services for the respective mobile devices. Alternatively, the service provider may be a third-party that utilizes the mobile communication services of the mobile network operator and provides a device control application suitable for use with the gateway device 150 the customer connected devices 161-169, and the PCP 126.

Detailed examples of the customer connected device control system service are explained with reference to the following examples of FIGS. 1-6.

With reference to FIG. 1, the service provider network 123 includes network devices configured to implement provisioning of home automation components with the service provider network 123. For example, the service provider network 123 includes network devices, such as a persistent connection platform (PCP) 126, and a public server 125. The public server 125 of the service provider network is a server that is accessible via a mobile communication network, such as MNO communication network 120, or the data communication network 127, such as the Internet, by any person (e.g., a subscriber or non-subscriber). A user that subscribes (i.e., subscriber) to a customer connected device control service (e.g., a home automation control service) provided by the service provider has access via the public server 125 to the PCP 126. The public server 125 is configured to connect to the data communication network 127 and establish a connection with the home router 140. Of course, the public server 125 is also accessible via the internet router 142, but not for the purpose of providing the home automation service. The internet router 142 is an on-premises Wi-Fi router that allows devices, such as tablets, computers and smartphones to access the data communication network 127 (i.e., the internet). The public server 125 is coupled to the MNO communication network 120 and the data communication network 127, and provides access to the PCP 126 from devices, such as the home router 140 or mobile devices MD1-MD3, that communicate via the data communication network 127 and/or the MNO communication network 120 with the service provider network 123. The PCP 126 connects devices, such as gateway 150 and connected devices 161-169, to mobile devices, such as MD1-MD3, outside the home network 130, and initiates and maintains communication via a persistent connection with the respective mobile devices MD1, MD2 or MD3 and with the gateway 150 inside the home network 130. Mobile device MD3 is shown connected to the Internet 127 via an access point 128. The access point 128 may be a Wi-Fi, WiMax or other type of wireless network access point. Similarly, a persistent connection is established between the mobile device MD 3 and the PCP 126 of the service provider network 123, in this example, via public server 125 and the Internet 127.

The connection is a persistent connection because the PCP 126 and/or the gateway 150 does not permit the connection to "timeout" due to a lack of data exchange, for example, by using "stay-alive" commands as are known in the art. The use of the term "connection" in this context refers to a logical communication session between the PCP 126 and the gateway 150 that is not necessarily a physical or electrical connection. For example, the persistent connection is established by exchanging a hypertext transfer protocol (HTTP) connection messages between the PCP 126 and the gateway 150. Also, it is appreciated that HTTP is an application layer protocol and requires a transport layer protocol (e.g., Transmission Control Protocol (TCP) or Internet Protocol (IP)) for device-to-device data transfer. The persistent connection may be considered a dedicated data pipe for real-time or near real-time data exchange between the PCP 126 and the respective devices 161-169 via the gateway 150. Similarly, a persistent connection exists between the PCP 126 and a device control application executing on a respective one of the mobile devices MD1-MD3. The persistent connection is an HTTP connection that uses the same packet connection to send and receive multiple HTTP requests and responses, as opposed to establishing a new connection for every single request and response pair.

For example, the persistent connection between the gateway device 150 and the PCP 126 via the public server 125 is a connection maintained through the data communication network 127 and the MNO communication network 120 and via the home router 140 of the home network 130. The persistent connection is a logical "always on" connection that is available without having to re-authenticate the connected devices. In other words, time and network resources are saved by not having to re-authenticate the gateway device 150 to the PCP 126 and, upon successful authentication, re-establishing the connection between the gateway device 150 and the PCP 126. Conversely, as mentioned above, the dashed arrows shown in FIG. 1 indicate a logical on-demand connection. For example, customer connected devices 161-169 have an on-demand connection with the gateway 150. Similarly, the connections between the computing devices 152 and 154 with the internet router 142 and connection of the internet router 142 with the data communication network 127 are logical on-demand connections.

Explained differently, the Persistent Connection Platform (PCP) 126 is configured to maintain a long lived transmission control protocol (TCP) connections (i.e. persistent connections) between multiple devices irrespective of the underlying network. An advantage of the described examples is that the connected devices 161-169 of FIG. 1 are accessible through a secure persistent connection maintained and secured by the service provider network that enables communication using minimal network resources. Since the connection is a persistent connection repeated requests and responses do not have to be exchanged and processed by the network resources. The PCP solution provides a secure communication channel that is device-agnostic. Security-wise, it obviates the use of Port forwarding on the Router for an IP Camera—which prevents intruders from hacking into the system. It is also independent of the disparate protocols (such as Zigbee, Z-wave, TCP/IP, BLE (Bluetooth Low Energy) etc) that each device may employ. Updating of firmware on these devices is also supported, regardless of the hardware. Thus, the customer can easily add a device of their choice to their current system without concerning themselves with the technical protocols that are involved. Moreover, the devices can be easily accessed from anywhere via the Internet.

In an example, the PCP 126 includes two software modules: the Push Client (PC) and the Push Engine (PE) (both not shown, but described in more detail with reference to other examples). The PE of the PCP 126 is configured for creating and managing a number of persistent TCP connections. The PE acts as a server module of the PCP 126. Meanwhile, the PC acts as the client module and is associated with a device or system that is maintaining a persistent connection with the PE, such as the gateway 150, the public server 125 and the mobile devices MD1-MD3.

The PE is implemented in the PCP 126 that communicates via the public server 125, which, in some examples, is maintained and controlled by the home automation service provider. A PC can be located on the Internet or in a private network, e.g., behind the home router in customer's home network. In an implementation of the customer connected device control (also, referred to as the "home connect" and "device control") application, the gateway 150 also hosts a PC module. Using the PC module, the gateway 150 is able to create a connection with the PCP 126 via the Internet 127 and open a bi-directional channel to communicate with other devices connected to the PCP 126. The mobile devices MD1-MD3 with the home connect application also include a PC module and may connect to the PE via the MNO communication network 120, which may be a cellular network. The public server 125 also executes a home connect application includes a PC module. The public server 125, in an example, is also configured to push messages to the mobile devices MD1-MD3 and the gateway 150 via the PCP 126.

The MNO mobile communication network 120 includes a cellular radio access network (RAN), for example, a Long Term Evolution (LTE) network, an Enhanced Data rates for GSM Evolution (EDGE) network, Code Division Multiple Access (CDMA) 2000 network and the like, for communicating with the mobile devices MD1 and MD2. The MNO communication network 120 may also include business operations network devices, databases and servers, such as customer account databases, subscriber information and similar information. Although three subscriber mobile devices MD1-MD3 are shown, more or less devices may be accommodated. The subscriber mobile devices MD1-MD3 may be a smartphone, a tablet computer, a laptop computer, a personal computer, or any device that allows the user to connect to a cellular communication network, such as MNO mobile communication network 120, or a data communication network, such as the Internet 127.

The home network 130, depending upon the implementation, includes a home router 140 and a gateway device 150, an internet-connected device router 142 and internet-connected devices 152 and 154. For example, the home network 130 is one of a local area network (LAN), a Wi-Fi network or similar network. Alternatively, the home network 130 may include aspects of each of a LAN, Wi-Fi or similar network. The example gateway device 150 illustrated in FIG. 1 supports connection to and communication with a variety of home automation or personal connected devices within the home network 130 that communicate using disparate protocols such as Z-Wave devices 161, Bluetooth low energy (BLE) devices 163, Zigbee devices 165, transport control protocol/Internet protocol (TCP/IP) devices 167, and other devices 169, such as X10 protocol devices. For example, the connected devices 161-169 and the gateway 150 are connected to the home LAN/Wi-Fi (e.g. thermostat, switch, bulbs), Bluetooth (e.g. Fitbit), Z-Wave network (e.g., Motion/Flood sensors), Zigbee network (e.g., lawn sprinklers, home security) and other networks (e.g., X10, and the like). The types of home automation or customer connected devices 161-169 (i.e., "connected devices") that can communicate with the gateway 150 include customer connected switches (e.g., light, appliance, etc.), bulbs or home products (such as window coverings and treatments, door locks, entertainment systems, sprinkler systems, yard products, garage door openers, water and motion sensors, thermostats, and the like), network enabled cameras, network enabled thermostats, Zwave sensors (such as motion sensors, water detection system), an array of wearable devices, such as wearable devices (such as a fitness monitor, health monitors (such as FitBit®), a watch or devices integrated in clothing), other devices (such as a transportation borne device), and the like.

In an example, a user provides details regarding a connected device 161-169 to the gateway 150. This may be a registration of the respective connected device, such as for example, a camera 167, with the gateway 150. For example, the user provides the brand, model and/or serial number of the camera 167 to a user interface on a device, such as device 152 or 154 provided by an application, such as the device control application, used to interface with the gateway 150. The gateway 150 may access the required drivers (via, for example, the data communication network 127 and server 124, drivers stored in a memory of the gateway 150, or from a CD or other flash driver provided with the camera). Once registered, the gateway 150 begins communicating with the camera 167. For example, the camera may begin communicating with the gateway 150 according to proprietary protocols (for transfer of data commands and the like) used by the camera 167. In an example, each of the different home automation or personal connected devices 161-169 communicate via a different protocol that make interoperability of the respective devices difficult. Of course, only one, less than all or all of the different protocols may be used by the respective connected device(s) 161-169. In order to manage the disparate connected devices 161-169, the gateway device 150 is configured to interface with the connected devices executing via the respective protocols using, for example, application programming interfaces (API) of the respective protocols. The gateway 150 includes a physical and/or wireless interface 159 for connecting with the respective connected devices 161-169. The gateway 150 performs a discovery process and a pairing process with each of the connected devices 161-169. For example, the discovery process is performed according to a data discover protocol as is known in the art. Based on the data obtained during the data discovery process, the gateway device 150 obtains further information either from the connected device 161-169 directly or from the user registration process. For example, information, such as a manufacturer, model number, software/firmware versions, driver information, communication protocol, user credentials, and the like about each of the connected devices 161-169 may be obtained. In addition, the gateway 150 also includes a connection to a memory or data storage (DS) 158, which may be preconfigured to include such customer connected device-related information. Upon performing the data discovery process (and a pairing process between the respective connected device and the gateway 150, if not already completed), the gateway device 150 facilitates the management of connected devices 161-169 behind the home router 140 over the respective Wi-Fi, Bluetooth, Bluetooth Low Energy, Zigbee, Z-wave or other protocols. Of course, depending upon the communication protocol of the respective connected devices 161-169, the connections of the respective connected devices 161-169 to the gateway 150 may be via a wired or wireless communication path. For example, one device of a particular protocol, such as Zigbee, for example, may require a wired connection to the gateway 150 while control signals to other Zigbee devices is via a wireless connection according to the Zigbee protocol.

At this time it may be appropriate to discuss a couple of the more prominently used communication protocols that were mentioned above. For example, the Z-Wave communication protocol is a wireless communications protocol designed for home automation, specifically to remotely control applications in residential and light commercial environments. The technology uses a low-power RF radio embedded or retrofitted into home electronics devices and systems, such as lighting, residential access control, entertainment systems and household appliances. Similarly, the ZigBee specification is a suite of high level communication protocols used to create personal area networks built from small, low-power digital radios. The ZigBee specification is based on an IEEE 802.15 standard. Though low-powered, ZigBee devices can transmit data over long distances by passing data through intermediate devices to reach more distant ones, creating a mesh network. In addition, the Bluetooth low energy, Bluetooth LE, or simply BLE, which is also referred to as Bluetooth Smart, is a wireless personal area network technology designed and marketed by the Bluetooth Special Interest Group aimed at novel applications in the healthcare, fitness, gateway security, and home entertainment industries. Compared to "Classic" Bluetooth, BLE is intended to provide considerably reduced power consumption and cost while maintaining a similar communication range.

The gateway 150 communicates with the respective customer connected devices 161-169 via each of the device's respective communication protocol through an on-demand connection (illustrated by the dashed line). In other words, the communication pathway (i.e., the dashed line) is established and terminated by either the gateway device 150 or the respective customer connected device 161-169. For example, the Zigbee devices 165 are lawn sprinklers that are configured to turn on and off at specific times of day, and provide a notification to the gateway 150 whenever a turn on or turn off event occurs. In such a case, the Zigbee device 165 turns on, generates a notification that requires an on-demand communication path to be established to deliver the notification and terminates the communication path after the delivery of the notification to the gateway 150. The gateway 150 is configured via the interface 159 to communicate with one or more customer connected devices 161-169 simultaneously.

While the gateway 150 manages the customer connected devices 161-169, connectivity to the customer's mobile devices MD1-MD3 is managed by the PCP 126 via the MNO communication network 120, for example, over a 4G cellular network.

An advantage of using a gateway, such as gateway device 150, in the system 100 is that the gateway device 150 enables bidirectional communication between devices (e.g., allowing interactivity between devices) and is agnostic to any device communication protocol. The infrastructure substantially guarantees secured connectivity with respectable quality of service.

In this example, the home router 140 is a router dedicated to the gateway 150. Meanwhile, the Internet router 142 provides devices other than the gateway device 150, such as 152 and 153, connectivity to the data communication network 127 via a network (not shown), such as a fiber optic, coaxial cable, satellite or the like. In the example of FIG. 1, devices 152 and 154 are shown as a personal computer and a laptop computer respectively, but could also be smart televisions, tablets, smartphones, appliances or any other internet-connectable device. In addition, the connections of the devices 152 and 154 via the internet router 142 with the data communication network 127 are on-demand connections.

The connections for the internet router 142 and the home router 140 outside the home network 130 are different. The internet router 142 connects to the data communication network 127 via the Internet service provider (not shown) and receives data from servers, such as servers 124. For example, one or more of the servers 124 may provide application-related data, connected device-related data, such as drivers or firmware updates, streaming content or the like to devices 152 and 154 within home network 130. The home router 140 connects to and is accessible from the Mobile Network Operator (MNO) communication network 120 and/or the service provider network 123 via the data communication network 127. In another example, the Internet router 142 and the home router 140 may be configured to be a single router device, but with the separate functionality provided by the respective home router 140 and internet router 142. For example, a single router device (not shown) may be provided to a subscriber for use in the subscriber's home network, but the single router device has two separate routers, one being the Internet router 142 and the other being home router 140. Alternatively, the home router 140 and the gateway 150 may be configured together in a separate device such as a set-top box, a stand-alone device or the like. In some examples, the home router 140 and/or the gateway device 150 are configured to allow devices 152 and 154 to communicate with the connected devices 161-169.

In a general example of the operation of the gateway 150, once connected to the user's home network 130, the gateway device 150 seeks out all customer connected (e.g., Bluetooth, IP, Zigbee, Z-wave and the like) devices 161-169 connected to the user's home network 130. Upon identifying the customer connected (i.e. connected) devices 161-169, the gateway device 150 initiates and maintains connection with all the connected devices 161-169 in the home network 130. The gateway device 150 by sending a persistent connection request via the home router 140 also establishes a preliminary communication connection with the PCP 126 through the public server 125. In order to establish the connection with the PCP 126, the gateway device 150 and the public server 125 exchange network credentials, such as user account information and the like, based on the service's subscriber information and/or on the subscriber's relationship with the MNO (if the service is provided by the MNO) to authenticate the gateway device 150 to the public server 125 in the service provider network 123. For example, the subscriber-related credentials include information related to a mobile device of the subscriber, such as an MDN or IMEI, a subscriber user name and a subscriber password of a subscriber authorized to receive the services provided through the device control application services. Upon a successful authentication of the subscriber by the public server 125, the public server 125 sends a request to the PCP 126 to establish a persistent connection with the gateway 150. For example, the public server 125 sends with the request the IP address of the PCP 126 transmits a HTTP request to the gateway 150 requesting establishment of a secure, persistent connection. Upon completion of a handshaking process, the secure, persistent connection is established between the PCP 126 and the gateway device 150. The PCP 126 maintains the persistent connection with the home router 140 and the gateway 150.

The persistent connection thus enables the device control application launched on the mobile device MD1 to receive real-time or near real-time data over the MNO communication network 120 from the PCP 126 or the gateway 150. For example, the real-time or near real-time data is pushed to the mobile device MD1 by the PCP 126 over the persistent connection, as data from devices 161-169 becomes available from the gateway 150. As noted earlier, a persistent connection is a logical communication session established between a mobile device MD1 and PCP 126 so that the mobile device MD1 can receive real-time or near real-time data from the PCP 126. This connection is established over a packet connection using various protocols, including TCP/IP, Secure Socket Layer (SSL), and HTTP protocols.

For example, the PCP 126 assigns a data transmission identifier to each of the customer connected device connected to the gateway 150. Prior to or after authentication of the gateway device 150 with the PCP 126 (and the establishment of the persistent connection), a device control mobile application for controlling the customer connected devices 161-169 installed on the user's mobile device or wearable device, such as one or more of devices MD1-MD3, establishes a connection to the PCP 126. The device control mobile application of the mobile device (e.g., MD1) is authenticated by the PCP 126. Upon successful authentication of the device control mobile application by the PCP 126, the mobile application/controller of the respective mobile device MD1 is able to be connected by the PCP 126, via the home router 140, to the gateway device 150 over an established persistent connection. Details of the establishment of the connection between the MD1 and the gateway 150 made by the PCP 126 are described below. The established connection allows communication with and control of the customer connected devices 161-169 in the home network 130 via the device control mobile application/controller executing on the mobile device MD1.

As shown by the solid arrows in FIG. 1, a persistent connection is maintained between the gateway device 150 and the PCP 126 of the service provider network 123. The persistent connection may use the TCP/IP protocol to exchange communications between the gateway 150 and the mobile application on the mobile device MD 1. The persistent connection creates a data pipeline between the gateway device 150 and the PCP 126 and in turn with user's mobile devices MD1-MD3. The public server 125 provides authorization for the mobile devices MD1-MD3 to connect to the gateway device 150. For example, one of the BLE devices 163 may be a door lock that is infrequently used during the course of a typical day. The door lock 163, for example, may be placed in the lock position (e.g., when the subscriber is leaving home to go to work) and placed in the unlocked position in the evening (e.g., upon the subscriber's return from work). As a result, the maintenance of a persistent connection between the door lock 163 and the gateway 150 is inefficient and unnecessary. Thus, an on-demand connection is more logical and efficient for the connection between the devices 161-169 and the gateway 150. Continuing with the example, the door lock 163 is configured to send a notification to the gateway 150 only when the door lock is operated. When the door lock 163 is operated, a processor within the door lock 163 may generate a connection request for the gateway 150. In response to the connection being made between the door lock 163 and the gateway 150, the door lock 163 sends a notification in response to the operation of the door lock 163. In other words, an on-demand connection is made whenever a connected device needs information from the gateway 150 or from another device, such as mobile device MD1. In response to receiving the notification, the gateway 150 forwards the notification to the PCP 126 via the persistent connection with the PCP 126.

Each networked-enabled, or connected, device 161-169 connected to the service provider network 123 (via the home router 140 and gateway device 150) is assigned by the PCP 126 a unique data transmission identifier, called a pushID. All communication among the connected devices 161-169 and the PCP 126 (that have been assigned a pushID by the PCP 126) use the pushID for addressing. For example, a Zwave device 161 may be assigned a pushID, which may be an 8 bit value (e.g., 01010101) that allows for 256 different pushIDs to be assigned. Using the pushID alone, the PCP 126 is configured to perform the following tasks efficiently and in a manner that is scalable: peer-to-peer messaging, peer-to-peer media sharing, and/or peer or server initiated messaging. In addition, the PCP 126 is configured to perform predefined operations on suitably configured customer connected devices 161-169 based on commands from one or more of the respective mobile devices MD1-MD3. Predefined operations can be programmed by the user on their device; an example would be to open the Garage door when the user is approaching their home. This action can be triggered using GPS (e.g. when the user's phone coordinates match their home coordinates). Additionally, the user can choose to turn the house lights on and change the thermostat settings, based on when the Garage door was opened. For example, the respective customer connected devices 161-169 provide status data, messages, and other communications to the PCP 126 for transmission to one or more mobile devices MD1-MD3. In one example, the gateway 150 is configured to send status data or messages to a particular mobile device of mobile devices MD1-MD3. The data or messages may be provided for a particular client mobile device MD1-MD3 based on a subscription or account of a user/customer of the client mobile device with the service provider. The mobile devices MD1-MD3 in some examples authenticate and register themselves with the public server 125, in order to establish a persistent connection with the PCP 126.

The PCP 126, in some examples, has access to subscriber-related information stored in databases (not shown) coupled to the MNO communication network 120. The subscriber-related information, for example, includes subscriber user names, user credential information, network configuration and performance information (e.g., download/upload speed, home router specifications and the like), user account information and the like. In some examples, the subscriber-related information is used by the PCP 126 or public server 125 to authenticate devices, such as gateway device 150 and/or mobile devices, such as MD1-MD3. The PCP 126 cannot connect to the gateway 150 directly since it is behind the home router 140 and is thereby undetectable by devices outside of the home network 130 without proper authorization.

In another example of the operation of the system 100, the gateway 150 identifies each of the customer connected devices 161-169 of the different protocols connected to the gateway 150. The gateway 150 retrieves, via a data discovery process, from each of the connected devices 161-169 information about the respective sensors such as manufacturer, model, protocols, software versions, firmware versions, identifiers, and device credentials. The gateway 150 uses some of the retrieved information to generate a profile of the respective enabled customer connected devices 161-169. Only some of the retrieved information is used in the generation of the profile that is shared with the PCP 126 because the information that is not included may include credential related information that if left unsecured outside of the home network 130 may comprise the security of the respective devices 161-169. The gateway 150 relays the generated profile to the PCP 126, which maintains the enabled customer connected device 161-169 profiles in a data storage (not shown).

In the example, each of the mobile devices MD1-MD3 has a computer application for controlling and receiving/exchanging information with the enabled customer connected devices 161-169 stored in memory. When the device control application begins a registration process with the PCP 126. For example, a handshaking procedure is performed by the device control application authenticates through the MNO communication network 120 by exchanging device control application credentials stored on the mobile device with the PCP 126. For example, the credentials may include a user name, a service provider account number, a user passcode, encrypted security keys, and similar encrypted or unencrypted information that uniquely and securely identifies the device control application to the PCP 126.

Figure 2:
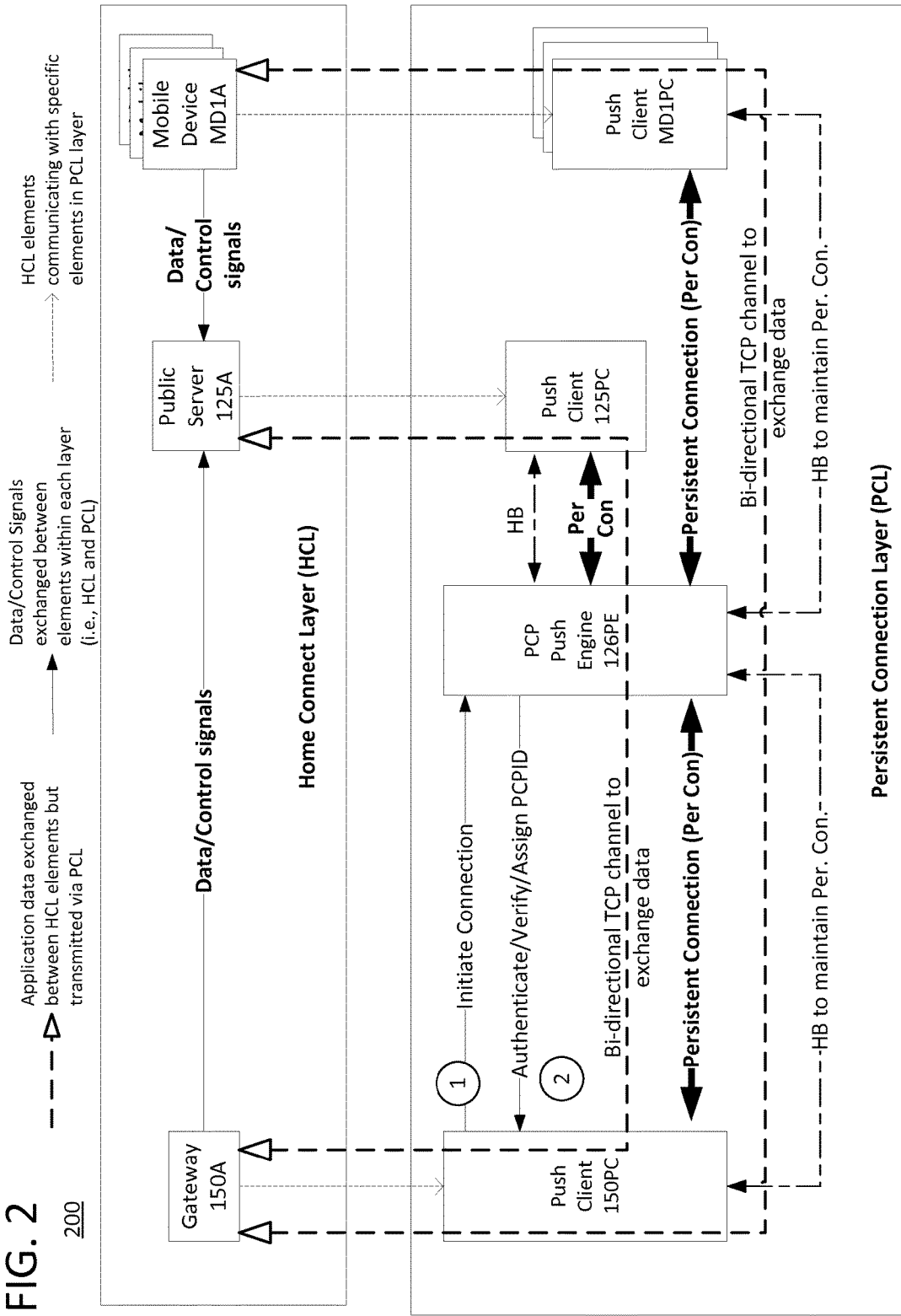
FIG. 2 is a block diagram illustrating an example of the logical connections and logical separation between the elements of a service provider network and home network of FIG. 1.

At this time, it may be appropriate to describe with reference to FIG. 2 the connections between the various system elements in a logical manner to better understand the interaction of the elements and the improvements provided by the described examples. FIG. 2 is a block diagram illustrating an example of the logical connections and logical separation between the elements of a system for providing the connected home monitoring service described herein. The system 200 includes the service provider network 123 and home network 130 of FIG. 1. In an example, the customer connected device control application (i.e., home connect application) executing on the public server 125 is also configured to push messages to the mobile devices MD1-MD3 and the gateway device 150 via the PCP 126. The logical relationship between the PCP 126 and the customer connected device control application is shown in FIG. 2. As shown in FIG. 2, when executing the customer connected device control application on mobile devices MD1-MD3, the gateway device 150 and the PCP 126 are executing their respective instances of the customer connected device control application that form a logical relationship between the PCP 126, the gateway 150 and connected devices 161-169. The logical relationship includes two logical layers: the Home Connect Layer and the Persistent Connection Layer.

The Home Connect Layer (HCL) is a logical representation of the customer connected device control application, and the Persistent Connection Layer (PCL) is a logical representation of the PCP push engine and push clients. The system elements, such as the gateway 150, the public server 125, and the mobile devices MD1-MD3 when implementing the customer connected device control application communicate within the HCL for the exchange of data and control signals related to the customer connected device control application. In the HCL, each of the gateway 150, the public server 125, and the mobile devices MD1-MD3 executes an instance of the customer connected device control application as illustrated by the reference label "A" that is appended to the end of the respective reference number (e.g., gateway 150A, public server 125A, and MD1PC-MD3A). In addition, each executing instance of the customer connected device control application implements a Push Client (PC) module on each respective device. However, the respective PC is logically a part of the PCL. For example, the instance of the device control application executing on the gateway 150 (i.e., gateway 150A) implements the logical PC 150PC, the public server implements the logical PC 125PC, and the mobile devices MD1-MD3 respectively implement logical PCs MD1PC-MD3PC. All logical push clients, gateway PC 150PC, public server PC 125PC and mobile device PC MD1PC-MD3PC, are shown in the PCL since logically the respective PCs reside in the PCL. When the PCP 126 is configured to execute programming that implements the PCP 126 Push Engine (PE) 126PE, which is also shown in the PCL since the PE logically resides in the PCL. The example of FIG. 2 is useful for illustrating communication between the logical HCL elements and the logical PCP 126PE on the PCL and the establishment of persistent TCP connections. The persistent connections are shown in FIG. 2 by the bolded arrows labeled "Persistent Connection (Per Con)" or "Per Con." The PC 150PC and PC MD1PC-MD3A and PCP 126PE logical modules interact to maintain the TCP connection via regular heartbeat messages. Occasionally, heartbeat (HB) messages are exchanged between the respective PCs and the PE to maintain connectivity by ensuring the connection remains open. The HB messages are shown by the alternating long dash-short dashed line labeled "HB to maintain Per Con." or "HB." In some examples, the HB messages are exchanged every 28 minutes or at some other interval. The HB message interval, in an example, is periodic, but in other examples, the HB message is aperiodic. In an alternative example, the HB messages are exchanged or generated by either the PC or the PE in response to some event, such as an activation of or a subscriber interaction with a connected device, such as devices 161-169 of FIG. 1. For example, when subscribers are away from the premises, the HB message may be periodic, but when the subscribers are at the premises, the HB messages may be sent when a user interacts with a connected device. In cases where the HB signal is lost, a new persistent TCP connection is initiated by the PC. HB messages from the HCL elements pass through the established TCP connection maintained by the PCL.

In addition to the HB messages, data messages from the HCL elements pass through TCP connection maintained by the PCL. In other words, the gateway 150PC, home connect public server 125PC, and the mobile devices MD1PC-MD3PC communicate information related to the mobile devices MD1-MD3 and the connected devices 161-169 via the persistent TCP connections established by the PCP 126PE. The logical HCL elements can also communicate with each other outside the PCP 126PE. For example, as shown by the data/control signal arrows of FIG. 2, the gateway 150A and/or mobile devices MD1PC-MD3A can connect to the home connect public server 125A using a hypertext transfer protocol secure (HTTPS) connections via web services. However, when the gateway 150PC and Mobile devices MD1PC-MD3PC communicate with each other, the exchange of data, such as connected device related-information and status information, occurs via the bi-directional TCP channel PCP 126PE instead of using an HTTPS connection. This makes the communication more secure and allows the communication to be performed without having to establish the HTTPS connection.

In an example, the PCP 126 including the PE 126PE executes on the public server 125, and is maintained and controlled by the service provider in the service provider network 123. Any PC of possibly many PCs may be implemented through the Internet or in a private network, such as a service provider customer's home network. A private network, for example, includes a gateway device 150 behind the home router 140. In the examples of the home connect application, the gateway device 150 includes the PC module. Using the PC module, the gateway device 150 creates a connection on the PCP 126 via the data communication network 127 (e.g., the Internet) and opens a bi-directional communication channel to communicate with other devices connected to the PCP 126. In addition, the mobile devices MD1-MD3 equipped with a home connect application also include a PC module and connect to the PCP 126PE via the MNO mobile communication network (i.e. cellular network) 120. The home connect service provider through the service provider network 123 hosts a home connect application and a PC module on the public server 125.

In an example of an initial connection between a PC and the PE, a respective PC, such as gateway 150PC initiates a connection (shown by the encircled 1) by sending a request to join to the PE 126A—in other words, gateway 150PC connects to the PCP 126PE using a TCP connection. For example, the request includes identifying information, such as identifiers of the requesting device, passwords and user names or the like. In this case, the request includes gateway 150 identifying information. The request is secured, for example, by using encryption or using security features such as using a hash function and including the hash value in the request, or using other known security techniques. Upon receipt of the PCP 126PE validates (i.e., authenticates and verifies) the requesting gateway 150PC (shown at encircled 2), and after successful validation, the PE 126PE establishes a bi-directional TCP channel (shown as the dashed line with the open arrow heads) for the exchange of data communications. The PE126A maintains the connection and keeps the connection open using the occasional HB message mentioned above.

Once a PC of a respective device (such as a mobile device or another gateway) is connected to the PCP 126PE, the PC of the respective device is assigned a PushId, shown as PCPID in FIG. 2. The PushId is a unique identifier on the PCP 126. Using the PCPID, the gateway 150PC can send messages to other PCs connected to the PCP 126 PE that have also been assigned a PCPID, such as PC MD1. In other words, the PCs, PC 150PC, PC 125A and PCs MD1PC-MD3A communicate using each other's PushIds. The PCs connected to the PCP 126PE may discover each other via the PE 126A. For example, the PCP126 PE maintains a mapping of devices 161-169 to remote devices MD1-MD3 permitted by the subscriber to exchange communications with the devices 161-169 located in the subscriber's home network 130. In a further example, once a PushId of a remote PC executing on a device is known, any PC can send a message to the remote PC. Using the security features of the PCP 126 and with appropriate permissions of the contacted remote PCs, such a configuration creates a peer-to-peer system where PCs can discover and communicate with each other via the PCP126 PE while also maintaining individual connections between the respective PCs.

An description of the runtime detailed functionalities of the PCL layer are unnecessary for implementing and understanding the described examples which are directed to the functions of the home connect application and how the home connect application uses the PCP to communicate at the application layer. In order to provide a better understanding of exchange of control and data between the various elements described with respect to FIG. 2, it may be appropriate to describe an example of the signal flow for establishing the persistent connections between the gateway 150 and the PCP 126 and the mobile devices MD1-MD3 and the PCP 126 as well as a discussion of the information flow between the respective system components (e.g., mobile devices, public server and gateway).

Figure 3A:
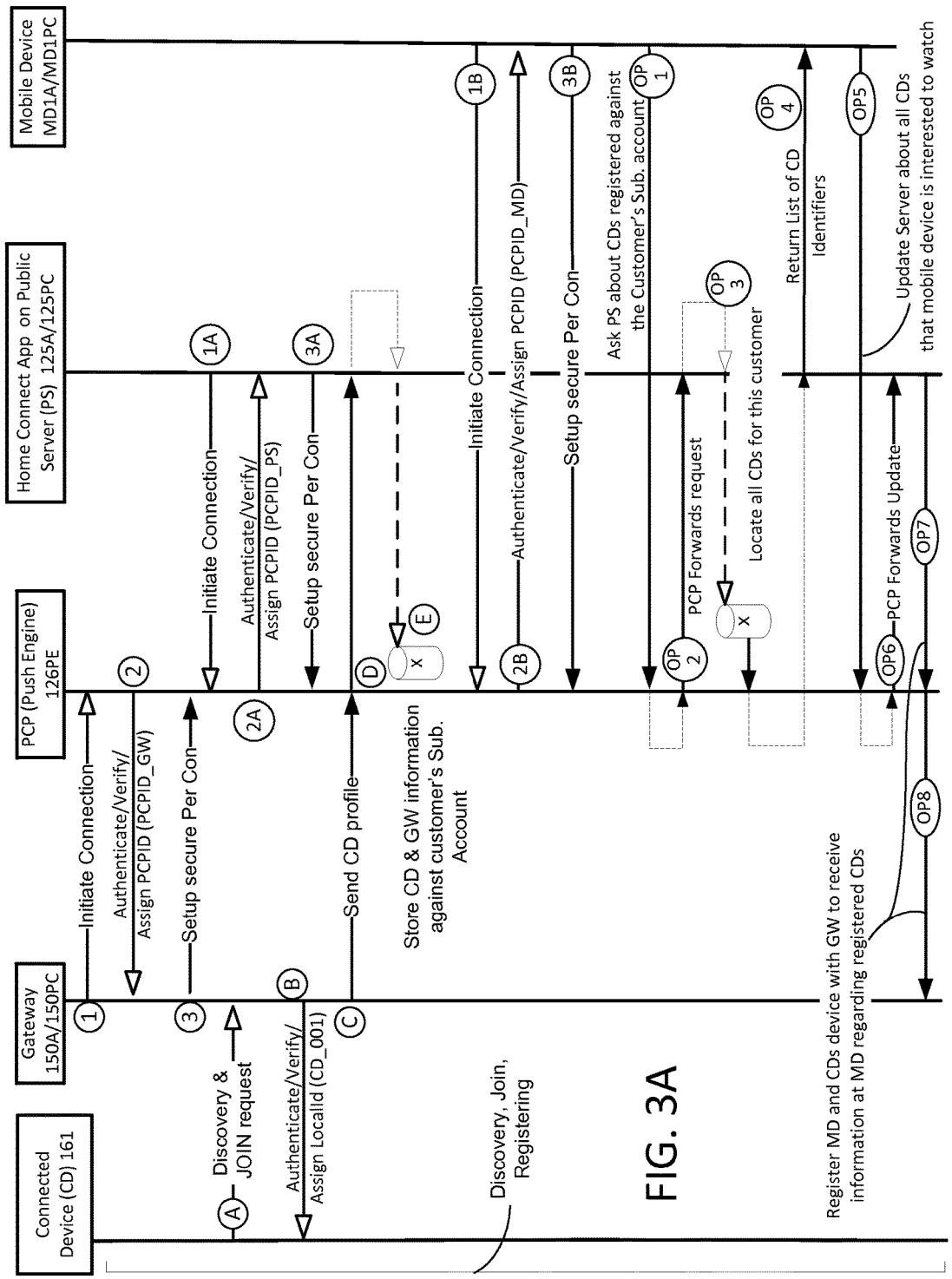

FIGS. 3A and 3B are a signal flow diagram illustrating an example of the signal flows among home connection logical layer elements through a persistent connection platform in the service provider network. In particular, the flow of signals exchanged between the HCL and PCL elements to setup the PCP level connections are shown. In FIGS. 3A and 3B, for simplicity, the PCL elements using only the PCP module are shown and described. In other words, FIG. 2 shows the connections setup between the individual HCL and PCL elements while FIGS. 3A and 3B illustrate the signals used to setup the connections between HCL and PCL.

Since the examples of FIGS. 3A and 3B refer to the connections established by the HCL and the PCL, the illustrated system elements include both the physical component (e.g., connected device 161) and the respective PC or PE provided through the execution of the home connect application (e.g., connected device 161 PC). The system illustrated in FIGS. 3A and 3B includes an example of a connected device (CD) 161, the gateway 150A/150PC, a PCP 126PE/126PC, the public server 125A/125PC and a mobile device, such as MD1PC/MD1PC.

As shown in FIG. 3A, each of the HCL elements—gateway 150, public server 125, and the mobile device MD1 initiate a connection setup process. For example, at step 1, the gateway 150A/150PC initiates a connection with the PCP 126PE by sending a connection request to the PCP 126PE. As discussed above with respect to FIG. 1, the connection request includes information that identifies the gateway 150 to the PCP 126. In response to the connection request, the PCP 126PE authenticates and verifies (i.e. validates) the gateway 150A/150PC as a device authorized to communicate with the PCP 126. In response to a successful validation, the PCP 126PE assigns a PushID, or PCPID, to the gateway 150A/150PC. In the example, of step 2, the PCPID assigned to gateway 150A/150PC is shown as PCPID_GW. Upon receipt of the assigned PCPID_GW, the gateway 150A/150PC completes the setup of the validated and secure persistent connection (Per Con), which is a TCP connection, with the PCP 126PE (Step 3). Similarly, at step 1A, the home connect application executing on the public server 125A/125PC initiates a connection with the PCP 126PE by sending a connection request to the PCP 126PE. The public server 125A/125PC connection request contains, for example, information, such as a security key or other code, that identifies the home connect application as an authorized application. In response to the connection request, the PCP 126PE validates the home connect application executing on the public server 125A/125PC as an application authorized to communicate with the PCP 126PE. In response to a successful validation, the PCP 126PE assigns a PushID, or PCPID, to the home connect application executing on the public server 125A/125PC (Step 2A). In the example at step 2A, the PCPID assigned to the home connect application executing on the public server 125A/125PC is shown as PCPID_PS. Upon receipt of the assigned PCPID_PS, the home connect application executing on the public server 125A/125PC completes the setup of the validated and secure persistent connection (Per Con), which is a TCP connection, with the PCP 126PE (Step 3A). In an example, the HCL gateway PC element 150PC uses the assigned PCPID, PCPID_GW, when communicating with the public server PC 125A, which is also an HCL element. Similarly, the public server PC 125A uses the assigned PCPID, PCPID_PS, when communicating with the gateway PC element 150PC.

The above processes are also performed by each of the respective mobile devices MD1-MD3 that are executing the home connect application. In the example of FIG. 3A at step 1B, the PC on mobile device MD1 (i.e., MD1PC), initiates a connection with the PCP 126PE by sending the PCP 126PE a connection request. The mobile device PC MD1PC connection request contains, for example, information, such as a security key or other code, that identifies the home connect application as an authorized application. In response to the connection request, the PCP 126PE validates the home connect application executing on the mobile device PC MD1PC as an application authorized to communicate with the PCP 126PE. In response to a successful validation, the PCP 126PE assigns a PushID, or PCPID, to the home connect application executing on the MD1PC (Step 2B). The PCPID assigned to the home connect application executing on the MD1PC is shown as PCPID_MD1. Upon receipt of the assigned PCPID_MD1, the home connect application executing on the MD1PC completes the setup of the validated and secure persistent connection (Per Con), which is a TCP connection, with the PCP 126PE (Step 3B).

In an example, the gateway PC element 150PC uses the assigned PCPID, PCPID_GW, when communicating with the public server PC 125PC or the mobile device PC MD1PC. For example, any direct message communicated between the gateway 150A/150PC and the public server 125A/125PC includes the respective PCPID of the device sending the communication in a header of the direct message. Similarly, the public server PC 125PC uses the assigned PCPID_PS in any communication direct to the gateway PC element 150PC. The mobile device PC MD1PC also includes the assigned PCPID_MD1 when communicating with either the gateway PC 150PC or the public server PC 125A.

Also, shown in FIG. 3A, there is a device, for example, device 161 that shown at step A attempting to connect to the gateway 150A/150PC by sending a discover and join request. The discover and join request may be made through various mechanisms, such through the "Plug and Play" data discovery techniques described above. Each of the devices 161-169 discover on protocols used by the respective manufacturer of each device and the capabilities (e.g., processor and operating systems) of the individual devices. In another example, the discovery of the devices 161-169 may be performed by the gateway 150A/150PC, which may periodically poll, for example, different frequencies of known devices in the proximity of the home network 130. A device 161 attempting to connect to the gateway 150A/150PC, or responding to the gateway 150A/150PC polling, transmits a join request to the gateway 150A/150PC. At step B, the gateway 150A/150PC authenticates and verifies the respective connected device 161 and assigns an identifier (i.e., Local ID) to the connected device 161 that uniquely identifies the connected device in the home network 130. For example as shown in Step B, the local ID assigned to the device 161 is (CD_001) for the connected device. Upon receipt of the assigned local ID, the device is a connected device 161.

In response to receiving the local ID, at step C, the connected device 161 sends profile information as discussed above to the gateway 150A/150PC. The gateway device 150A/150PC, in turn at step D, sends the connected device (CD) profile information to the PCP 126PE. The PCP 126PE sends the profile information to the public server 125. The public server 125A/125PC creates from the profile information a profile for each of the connected devices, such as connected device 161 connected to the gateway 150A/150PC. Using the created profiles, the public server 125A/125PC maps the connected device 161 to a mapping of the other connected devices connected to the gateway 150A/150PC. The mapping, for example, is performed by storing the CD 161 profile information and the gateway 150A/150PC PCPID with reference to the customer's subscriber account in a data store X (Step E). For example, the data record in the data store X includes the subscriber account identifier (e.g., customerID_X), the gateway 150A/150PC PCPID (i.e., PCPID_GW), the CD 161 Local ID (i.e., CD_001) and/or other connected devices connected to the gateway 150, associated mobile device identifiers, such as MDN or IMEI, or other information, such as additional identifiers of devices.

Of course, other mapping schemes may be used. The public server 125 maintains, for example, several mappings of connected device-related data. Examples of the mappings include: a mapping of the gateway and mobile devices attached to a given service provider subscriber account; a mapping of the PCP identifiers for each of the gateway and mobile devices for a given service provider subscriber account, a mapping all of the connected devices to a respective gateway and/or a mapping of the mobile devices for a given service provider subscriber account. In another example, additional information related to the device, such as the subscriber account preferences and identifiers, such as MDNs of mobile devices associated with the subscriber account may also be stored in the data store X. The data store X, for example, stores a data record corresponding to each connected device associated with the subscriber account identifier as part of the mapping. In another example, another mapping scheme includes an identifier of a primary mobile device (e.g., an MDN) associated with the gateway 150A/150PC in place of the subscriber account identifier.

These mappings are used by HCL elements, such as the gateway 150A/150PC, the public server 125 and the mobile devices MD1-MD3 to discover each other on the home connect application layer. The PCP 126PE maintains the mappings between the HCL elements and their PCP identifiers—this mapping is used to actually exchange messages on the PCL layer.

In some examples, a subscriber user may have access to multiple home networks through the service provider. For example, a user may have a number of connected devices (e.g., thermostat, window treatments, entertainment devices, lighting, appliances, and the like) in their residential premises home network, and also have a business premises home network with a number of connected devices (e.g., thermostat, lights, computer equipment, vending equipment and the like), so the user may have access codes or home network identifiers assigned by the customer connected device control application executing on the PCP 126PE. For example, as mentioned above with respect to step 2, the PCP 126PE assigns a PCPID to a respective gateway 150 (i.e., a PCPID_GW), which is associated with a customer account, and assigns another PCPID, such as PCPID_GW2, that uniquely identifies another gateway, such as a business premises gateway (not shown) that is associated with a same or different mobile device.

Returning to FIG. 3A, in order to determine which connected devices 161-169 are presently connected to the gateway 150A/150PC, the mobile device MD1A/1PC as well as the other mobile devices MD2A/2PC and MD 3A/3PC transmits a request intended for the public server 125 to obtain profiles of the connected devices. This allows the mobile devices MD1-MD3 to discover and communicate with connected devices 161-169. For example, at step OP1, the mobile device MD1 sends via the PCP 126PE a request intended for the public server 125. The request may include an identifier associated with the mobile device MD1, such as the MDN, and a gateway identifier that identifies the gateway 150A/150PC in the particular home network of interest to the user. For example, the request includes a series of identifiers, such as CustomerID_X, PCPID_GW2, CD01_Profile, CD02_Profile, and CD03_Profile. In response to receiving the request, the PCP 126PE forwards the request with the series of identifiers to the public server 125 (Step OP2). The public server 125 locates and retrieves all of the connected devices for the identified customer and identified gateway from the data store X (Step OP3). The public server 125 returns, at Step OP4, the list of connected devices to the mobile device MD1. The list may be composed of identifiers of each of the connected devices to the gateway 150A/150PC. For example, if the list includes two connected devices, the identifiers of the two connected devices may have a format such as PCPID_GW_CD01 and PCPID_GW_CD02. The mobile device MD1 receives the list of connected device, and the connected device control application executing on the mobile device MD1 stores the list of connected devices in a memory of the mobile device.

In an example, the MD1 connected device control application causes the presentation of the list, or a subset of the list, to be presented on a display device of the MD1. For example, depending upon settings in the application, the subset of the list of connected devices may be the connected devices that the user is most interested in monitoring or receiving notifications or alerts. For example, the user may choose a connected device 161-169, such as a thermostat and a front door sensor, as connected devices of interest. At a different time, the user may select other connected devices as connected devices of interest. The connected device application and the presentation of information by the application are described in more detail with reference to FIG. 6 below.

In response to the user selection of connected devices to monitor, the connected device control application on the mobile device MD1, at OP5, transmits an updated list of interested connected devices and an identifier of the mobile device MD1 to the PCP 126PE for subsequent delivery to the public server 125A/125PC. Upon receipt of the updated list of interested connected devices, the PCP 126PE forwards the updated list of interested connected devices to the public server 125A/125PC. The public server 125A/125PC is further configured to forward the updated list of interested connected devices to the gateway 150A/150PC for monitoring. At OP 7, the public server 125A/125PC forwards the updated list of interested connected devices to the PCP 126PE for subsequent delivery to the gateway 150A/150PC. The 150A/150PC 126PE forwards, at OP 8, to the gateway 150A/150PC. In addition, the gateway 150A/150PC registers the updated list of interested connected devices with reference to the mobile device MD1A/1PC.

Once all of the mobile devices, such as MD1 and MD 2 or however many are included in the subscriber account, and the connected devices of interest, such as CD 161, are registered with the gateway 150A/150PC, the gateway 150A/150PC begins maintaining the persistent connection with the PCP 126PE. FIG. 3B illustrates an example of persistent connection maintenance according to the disclosed subject matter. As shown in FIG. 3B, the gateway 150A/150PC begins maintaining the persistent connection by transmitting a heartbeat signal, or keep alive signal to the PCP 126PE (step HB1). In more detail, the PCP 126PE has a timer that monitors how long a connection is inactive, and should the timer reach a predetermined inactivity time limit (e.g., 5 minutes, 60 seconds or the like), the connection is terminated. The heartbeat (HB), or keep alive, signal is scheduled to be transmitted from the gateway 150A/150PC before the predetermined inactivity time limit is reached. Similarly, the home connect application of the public server 125A/125PC is also configured to generate a HB signal. The home connect application of the public server 125A/125PC is configured to transmit at a scheduled, or predetermined, time an HB signal to the PCP 126PE to maintain the persistent connection.

Figure 4:
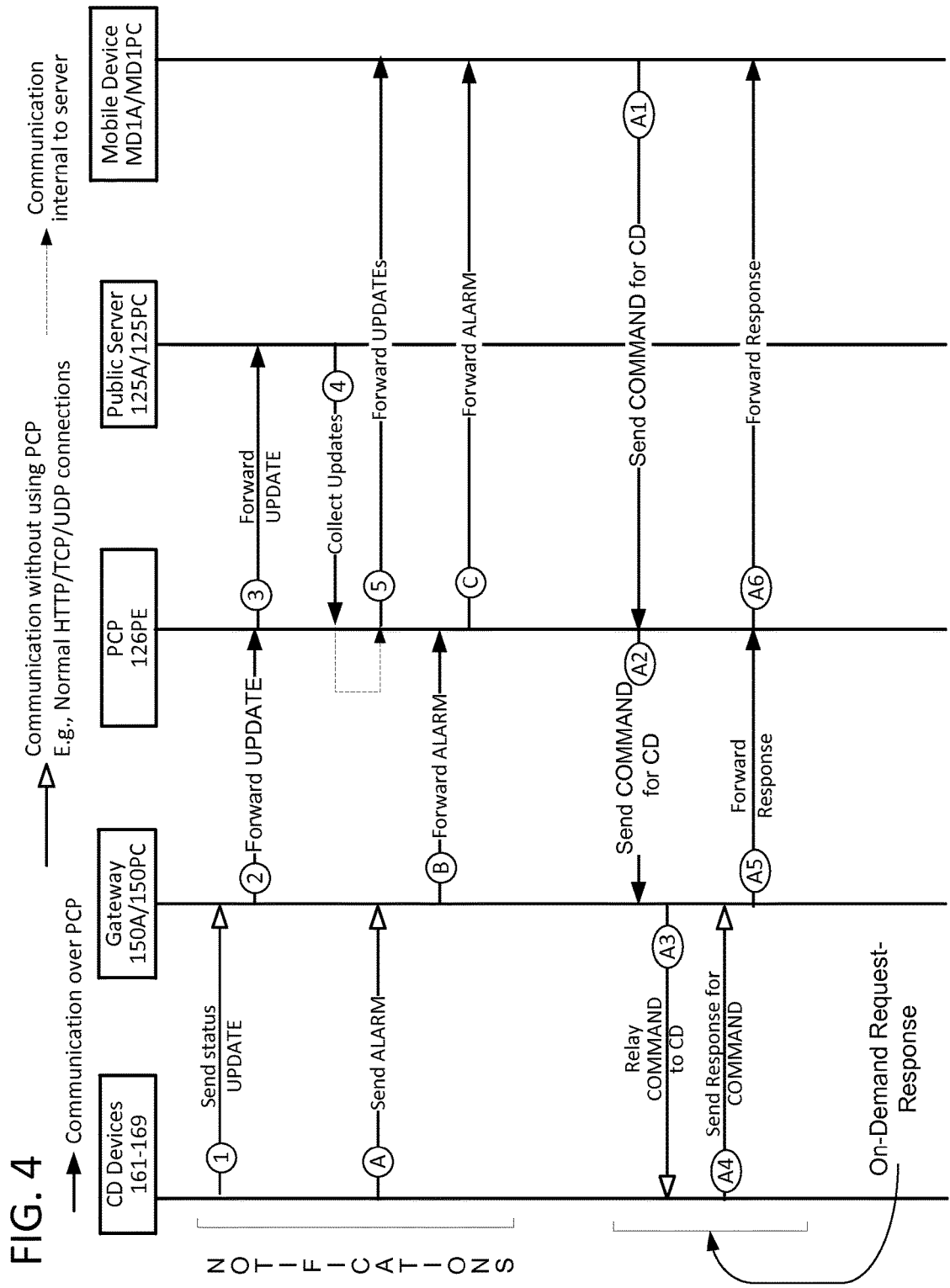
FIG. 4 is a signal flow diagram illustrating an example of the notification and command signal flows within the home connection logical layer and the persistent connection logical layer through a persistent connection platform in the service provider network.

FIG. 4 is a signal flow diagram illustrating an example of the signal flows within the home connection logical layer through a persistent connection platform in the service provider network.

FIG. 4 shows the signals exchanged by the HCL elements, such as the gateway 150A/150PC, the PCP 126PE, the public server 125A/125PC, and the mobile devices MD1A/1PC to MD 3A/3PC. As explained with respect to FIG. 3A above, once the mobile devices MD1A/1PC discover the connected devices 161-169, customers using the mobile device MD1A/1PC may decide which connected devices they want to follow and/or control from the mobile device MD1A/1PC. For these selected connected devices, the mobile device MD1/1A may receive regular updates. For example, as shown in FIG. 4, at step 1, one or more of the connected devices 161-169 sends a status update message to the gateway 150A/150PC, which forwards at (Step 2) the status update message to the PCP 126PE. The PCP 126PE forwards the status update to the public server 125A/125PC (Step 3). The public server 125A/125PC stores the status updates of the respective connected devices 161-169 in a data storage (not shown). Periodically, the public server 125A/125PC, at step 4, determines which connected devices are associated with a particular mobile device, or in response to a request from a mobile device, such as mobile device MD1/1A, the connected devices associated with the requesting mobile device MD1A/1PC. After determining the connected devices associated with the mobile device MD1A/1PC, the public server 125A/125PC sends a message or messages containing the status update information for one or more associated connected devices to the PCP 126PE. In response to receiving the collected status update messages, the PCP 126PE, at step 5, identifies from the status update message(s) the identity of the intended mobile device recipient (i.e., MD1A/1PC) and forwards the status update message(s) to the mobile device MD1A/1PC. In an example, the connected device 161-169 is a temperature sensor. The user has indicated in a preferences menu that a status update message of a change in the temperature is to be sent to the mobile device MD1A/1PC. For example, the user may wish to see a temperature update from a thermostat connected device for every change of two degrees in temperature. In order to receive the temperature status updates, steps 1-5 of FIG. 4 are performed.

In addition to the status update example, there is an example in which a user receive messages related to alarm conditions on the user's respective mobile devices. An example scenario, as illustrated in FIG. 4, includes a motion detector or flood detector detecting a critical condition and generating a warning alarm. All of the alarms selected by a user in a preferences menu of the home connect application that are generated by the respective connected devices 161-169 may be relayed to the mobile devices MD1A/1PC-3A/3PC via the gateway 150A/150PC. When a selected alarm is generated by a connected device 161-169, the alarm message is sent to the gateway 150A/150PC at step A. The gateway 150A/150PC forwards the alarm message to the PCP 126PE (Step B). As part of the forwarded alarm message, the gateway 150A/150PC appends a gateway identifier (i.e., PCPID_GW) to the alarm message. The PCP 126PE receives the alarm message from the gateway 150A/150PC. Based on the gateway identifier, the PCP126PE is able to determine the associated mobile devices to which the alarm message is intended. Upon determining the mobile devices associated with the received alarm messages, the PCP 126PE at step C, forwards the alarm message to the associated mobile devices MD1A/1PC-3A/3PC.

In another example, the home connect application executing on the mobile device facilitates an on-demand request-response function by configuring the mobile device to send a command to a connected device and receive a response. Consider another example in which a user would like to view their measured home temperature and thermostat setting (e.g. 72 degrees F.) (and, if the thermostat is capable, to change the thermostat temperature setting as they wish) on their mobile device (e.g. MD 1 or MD 2) while they are away from the user's home. The example process is described in more detail with reference to FIG. 4. In the example shown in FIG. 4, once mobile device MD1A/1PC, MD2A/2PC or MD3A/3PC discovers a respective connected device 161-169 a user wants to control, such as the above referenced thermostat, the mobile device, such as MD1A/1PC sends the command (at Step A1) to be executed on the connected device, such as 161, to the PCP 126PE. The command, for example, includes an identifier of the gateway 150A/150PC, an identifier of the connected device 161 to which is the target (i.e., intended recipient) of the command, an identifier, such as the MDN, of the mobile device, and/or other information that allows the PCP 126PE to identify and deliver the command to the gateway 150A/150PC. For example, the PCP 126PE accesses a look-up table using the gateway identifier included in the command to locate an address of the persistent connection. Upon identifying the gateway 150A/150PC to which the command is to be delivered, the PCP 126PE sends the command via the located persistent connection address to the gateway 150A/150PC (Step A2). The gateway 150A/150PC receives the command identifies the target connected device 161, and relays the command to the target connected device 161 (Step A3). The command may be an instruction, such as turn ON or OFF, change a setting or the like, an information request, such as a status request, or the like. If the command is an instruction, the target connected device 161 may respond with an acknowledgement that the command was performed or a negative acknowledgement. The target connected device 161 responds to the command and relays back to the gateway 150A/150PC at Step A4. The gateway 150A/150PC forwards (at Step A5) the response along with other information identifying the respective mobile device via the persistent connection to the PCP 126PE. The PCP 126PE identifies the mobile device that is the intended recipient of the response message and sends (at Step A6) the response message to the mobile device MD1/1A. This allows users (e.g., customers of the home connect service) to control devices at home on demand. An example scenario includes customers turning on a light switch at home or opening the garage door remotely.

An example of a system configured to stream video from an internet protocol (IP)-enabled camera to the customer's mobile device(s) is described below. The customer can buy any generic, IP-based camera of their choice, connect the camera to their home network, download an application provided by a home connect service provider to their mobile device, sign up for the service and begin streaming video from their home to their mobile devices.

Figure 5A:
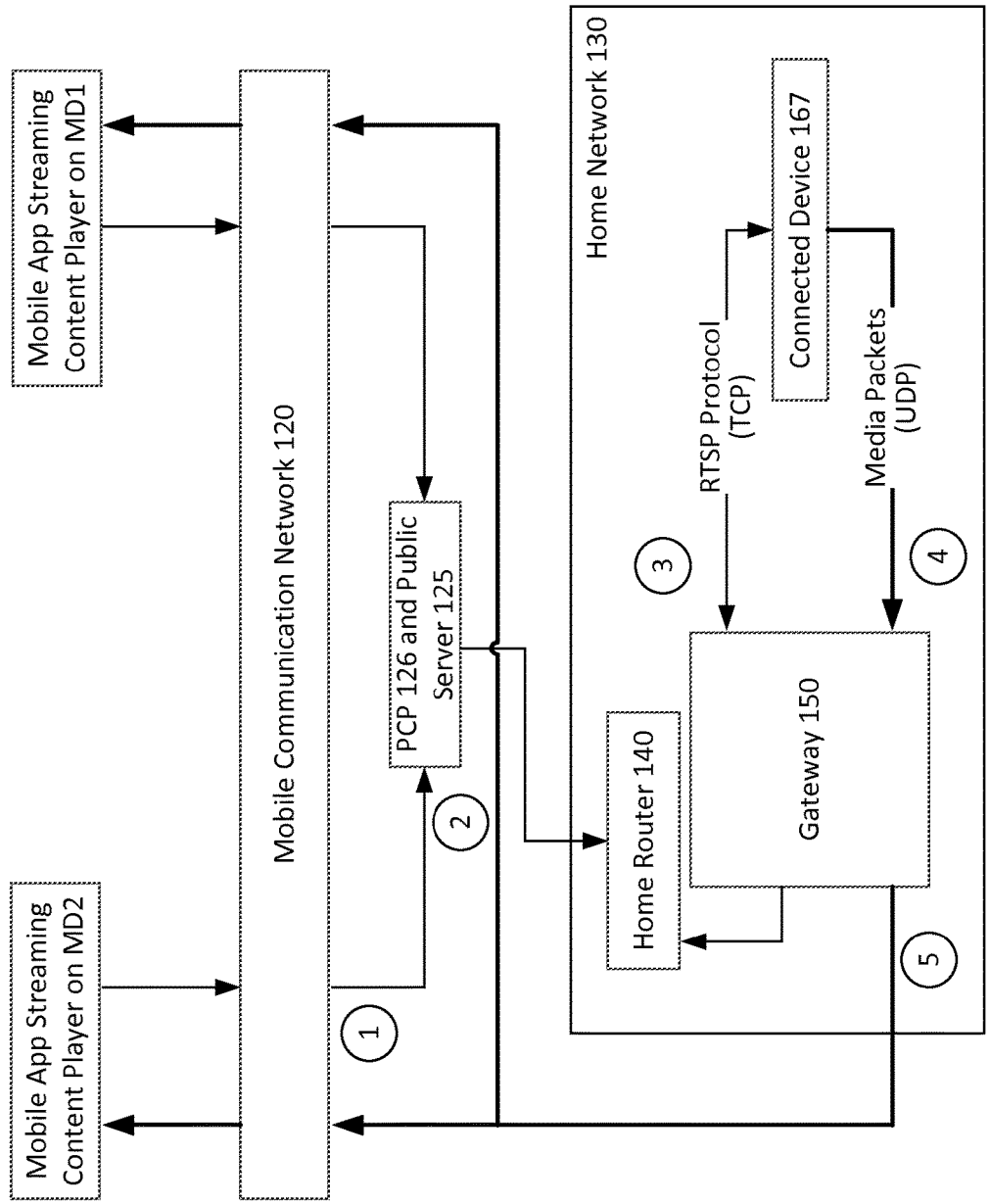
FIG. 5A is an example of a system configured to stream video from an IP-based camera to a customer's mobile device(s).

FIG. 5A is an example of a system configured to stream video from an IP-based camera to a customer's mobile device(s). The customer can buy any generic, IP-based, Real Time Streaming Protocol (RTSP)-enabled camera of their choice. FIG. 5A illustrates a high-level block diagram of a process for enabling the home connect application executing on a mobile device, such as MD1 to stream video from a network-enabled customer connected device camera, such as 161-169.

When the connected device is a camera configured to utilize the (IP), the IP camera is handled by the gateway 150 in a slightly different manner compared to other connected devices because the IP camera involves streaming of multimedia content. The protocol used to transfer streaming multimedia data from the IP camera to the authorized mobile devices is the RTSP protocol. The RTSP protocol involves a specific set of commands that sets up the (i) IP level connections (i.e., transmission control protocol/user datagram protocol (TCP/UDP) connections) for exchanging control signals and also (ii) the UDP level connections to deliver the streaming content from the connected camera to the respective mobile device(s).

In the example, one of network-enabled customer connected devices, such as TCP/IP device 167 is a video camera located on a premises of a service provider subscriber. A user registers the camera with the service provider via the public server 125 of the service provider network 123. When the user installs the camera and turns ON the camera, an initial handshake between the camera 167 and the gateway 150 occurs.

For example, the gateway 150 detects the presence of the camera 169 on the user's Wi-Fi network, local area network (LAN) or short-range wireless communication network and once found, the gateway 150, as discussed above, performs a data discovery process, and stores profile information of the camera 167. The gateway 150 serves as a proxy for the camera with respect to the service provider and the network-enabled customer connected device control mobile application. After obtaining the camera profile information, the gateway 150 relays, as discussed above, a camera profile to the PCP 126. The PCP 126 maintains the profile of the camera 167 in memory.

Subsequently, the mobile device (i.e., MD1) user in the example wants to receive a live (i.e., substantially real-time or with minimal time delay) video stream from the camera 167. When a user launches the network-enabled customer connected device control application on their mobile device (i.e., MD1), the home connect (or connected device control) application initiates a connection request via the MNO communication network 120 with the PCP 126. The home connect application executing on the mobile device MD1 or MD2 receives a user input selecting the connected camera to present the video captured by the connected camera. In response, the respective mobile devices MD1 and MD2 launch a streaming content player application, which initiates a request for content. The respective mobile devices MD1 and MD2 forward their respective requests for content to the PCP 126 via the public server 125. The PCP 126 via the public server 125 forwards the requests for content to the gateway 150. In response, the gateway 150 and the PCP 126 establish via the public server 125 respective user datagram protocol (UDP) connections with the mobile devices MD1 and MD2. The PCP 126 assigns a port (i.e., a UDP port) for each of the respective UDP connections, and a respective identifier of the UDP port is stored in a memory of the PCP 126. In response to receiving the connection request from the home connect (i.e., connected device control) application, the PCP 126 via the public server 125 forwards the streaming content player request to the gateway 150 behind the home router 140 (Step 2).

In response to the request, the gateway 150, at Step 3, initiates a RTSP Protocol connection with the camera 169. The gateway 150 requests information of the UDP port opened by the device control application to receive the streaming video data packets from the camera 167. The gateway 150 also obtains the internet protocol address assigned by the home router 140 of the camera 167.

The gateway 150 begins receiving UDP data packets from the camera 167 (Step 4). Through the UDP port identified by the PCP 126, the gateway 150 begins delivering the UDP data packets directly to the home connect, or device control, application executing on the mobile devices MD1 and MD2 through the public server 125 and the mobile communication network 120. As shown, the UDP data packets are not channeled through the PCP 126, but through a data connection (made between the public server 125 and the mobile devices MD1 and MD 2 through the mobile communication 120) that is different from the secure persistent connection between the gateway 150 and the PCP 126. Even though, data is transmitted outside of the persistent connection, the persistent connection remains for later use by the device control application. The PCP 126 is employed only through the initial handshake process executed by the gateway 150 and the device control application executing on the mobile device MD1. Since the handshake and data transfer processes are distinct, a breakdown in either one of the respective processes does not affect the other. Since data is being transferred via the data communication network 127 and the MNO communication network 120, it is secured (against hackers/sniffers) using at least two methods.

For example, in a first method, the UDP port is generated in a random fashion and is changed periodically (the user may not experience any interruption in their camera stream owing to this periodic change). This default feature of the RTSP protocol provides enhanced security by preventing ports from being "sniffed" by unauthorized users or systems. The device control application executing on the mobile device MD 1, for example, coordinates with the gateway 150 to define a port to determine a random port to deliver data. For example at random times, either the device control application or the gateway 150 generates signal that a port change is needed. An algorithm is executed that allows for a random selection of a new port and the connection is changes to the selected port. In this way, security is improved because a single entity does not select a port. The second method is encrypting the UDP data packets communicated between the gateway 150 and the device control application. The presently described examples provide a secure implementation for not only the connected camera 167, but for any of the connected devices, because the implementation maintains the respective devices 161-169 behind the home router 140 and, as a result, an unauthorized user does not know or may have difficulty determining the address of the respective devices 161-169.

In order to avoid loss of data because of internet congestion or the possibility of a lost connection, the gateway 150 is configured such that it can queue/buffer the data packets arriving from the camera 169. When the network connection is regained, the buffered data packets can be forwarded on to the device control application. Upon receipt of the UDP data packets, the device control application streams the received video UDP data packets using an appropriate video data player (as are known in the art).

In addition to receiving the video UDP data packets from the camera 169, the user, via the device control application, is also able to control the camera functions (if available), such as zoom, pan, tilt, turning ON/OFF as well as manage data files related to stored video data. In addition, the device control application facilitates the control and communication with other of devices 161-169 such as switches, bulbs, thermostats and motion and flood sensors regardless of the communication protocols used by the respective devices 161-169. The system can also be configured to relay updates to wearable devices, which may be any one or more of MD1-MD3, and can readily access any of the devices 161-169 that have a profile available on the PCP 126.

In order to avoid loss of data because of internet congestion or the possibility of a lost connection, the gateway is configured such that the gateway buffers the data packets arriving from the camera. When the network connection is regained the buffered data packets can be forwarded on to the mobile device steaming content player application.

Figure 5B:
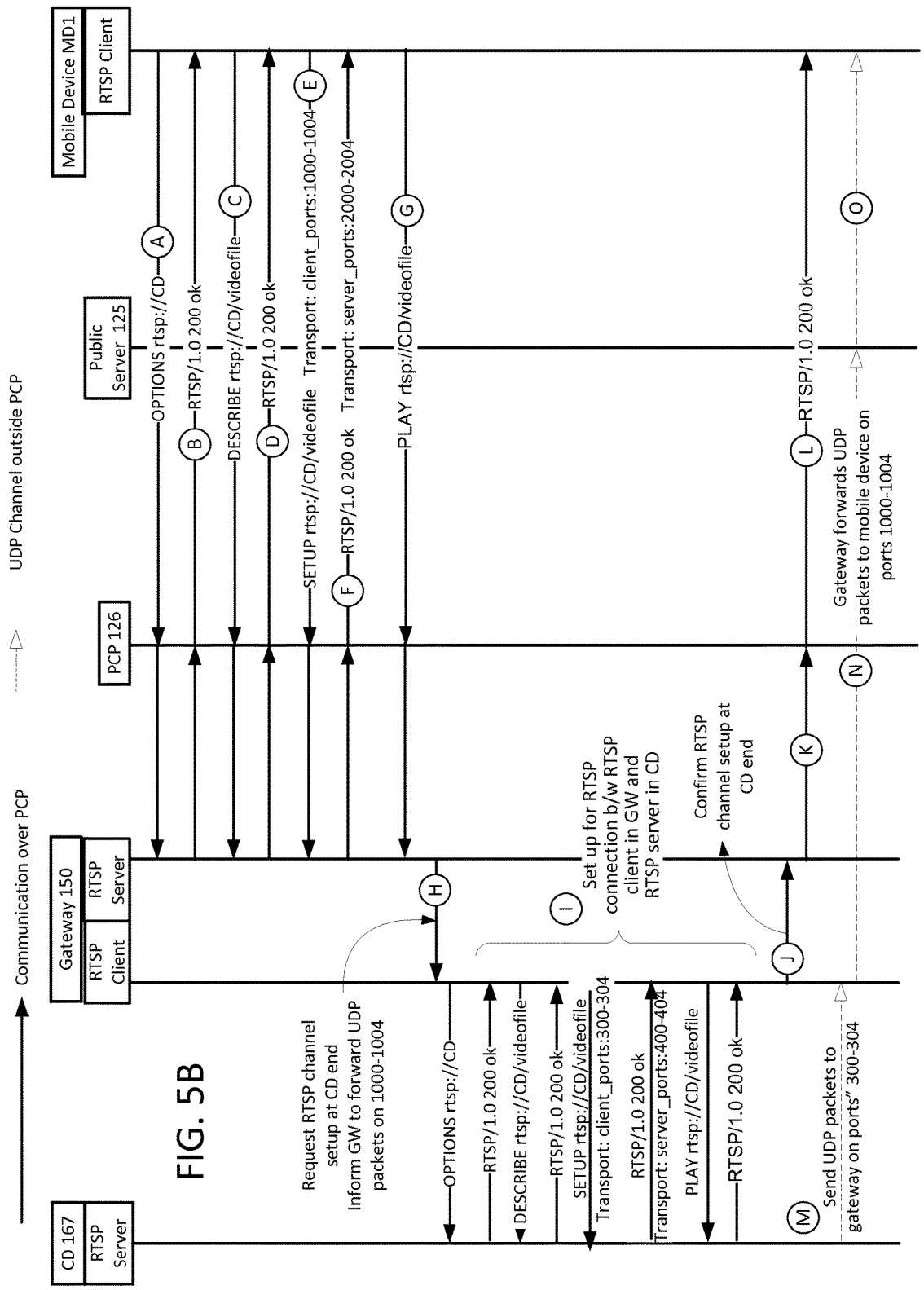
FIG. 5B is a signal flow diagram illustrating an example of the signal flows to stream video from an IP-based camera to a customer's mobile device(s).

FIG. 5B shows an example of the signal and content flow between an IP Camera and Mobile devices via the PCP. Typically, the RTSP protocol is initiated by the respective mobile device that is requesting the content. Each mobile device is configured with a RTSP client module that contacts a RTSP server module in the gateway 150. The RTSP client module is the consumer of the streaming content and the RTSP server module is the provider of the streaming content. The gateway 150 is configured to execute the RTSP server module. The RTSP client and the RTSP server modules exchange a series of commands to set up the channels to exchange the control signals and the streaming data.

For example, as shown in FIG. 5B, steps A-G, the RTSP protocol calls for a series of commands to be exchanged via the public server 125 and the PCP 126 between the RTSP client and RTSP server. In the example, the RTSP client executing in the mobile device MD1 initiates the connection and the RTSP server executing on the gateway 150 (referred to as "RTSP server" hereafter). The RTSP client sends (at Step A) the OPTIONS command to the RTSP server. In response, the RTSP server reply back with details of its capabilities, such as whether the RTSP server is able to support streaming media content, and acknowledges that the message was successfully received, understood and accepted by the RTSP server. Next, the RTSP client sends a DESCRIBE message to the RTSP server that includes information, such as a uniform resource locator (URL) or other information related to the specific content the RTSP client is able to accommodate, such as the format or bitrate, from the IP camera (Step C). If RTSP server responds with a message, such as the message at Step D, that the RTSP server can support the requested content, the RTSP client requests, at Step E, in a SETUP message to establish the UDP ports used for exchanging control signals and the UDP ports the RTSP client has selected (i.e., 1000-1004) to receive the streaming content from the RTSP server. In response to the SETUP message, the RTSP server returns an acknowledgement message that also includes the UDP port identifiers (i.e., Transport: server_ports: 2000-2004) that the RTSP server has selected to use to communicate with RTSP client (Step F). At this point, the RTSP client and RTSP server have reserved the respective UDP ports specified for communicating with each other. The RTSP client sends a PLAY command from the RTSP client of the mobile steaming application player on the mobile device MD1 includes MD1 identifying information requesting the RTSP server module of the connected device 167 to start sending the streaming content on the specified ports (Step G).

In order for the gateway 150 to deliver the requested streaming content to the requesting mobile device MD1, the gateway 150 is configured with a RSTP client and a RTSP server. As a result, the gateway 150 is able to act as a streaming content RTSP server to the requesting mobile devices and act as a streaming content RTSP client to receive the streaming content provided by the IP camera 167. As shown in FIG. 5B, the gateway 150 acts as the proxy between the mobile device MD1 and the connected device (i.e., IP camera) 167. In other words, the gateway 150 is able to perform the set up functions of a RTSP client and the IP camera 167 performs the set up functions of a RTSP server. For example, at Step H, the RTSP server of the gateway 150 sends a request to establish a RTSP channel for streaming the content to the RTSP client that is also executing on the gateway 150.

The gateway 150 executes the RTSP client that sends RTSP commands such as the OPTIONS, DESCRIBE and SETUP commands sent in Steps A, C, E and G described above, and the IP camera 167 executing the RTSP client responds to the gateway 150 RTSP client with acknowledgment messages similar to those provided in Steps B, D and F described above. A specific example of the RTSP messages exchanged between the gateway 150 RTSP client and the IP camera 167 RTSP server are shown in Step I. In other words, the gateway 150 using the same commands as the mobile device MD1 and the gateway 150 sets up their own RTSP channel (as explained above) and the gateway 150 and the IP camera 167 sets up a separate RTSP channel. In response to the successful completion of the RTSP commands to establish the RTSP channel between the IP camera 167 and the gateway 150 RTSP client, the RTSP client on the gateway 150 sends an acknowledgment message to the RTSP server of the gateway 150 (Step J). The RTSP server of the gateway 150 sends the acknowledgment message, at Step K, to the PCP, which via the public server 125 forwards the acknowledgment message to the RTSP client of the mobile device MD1.

In this example, in order for a mobile device, such as MD 1, to receive content from a specific IP camera 167, each mobile device MD1 setups a RTSP channel with the gateway 150. But the gateway 150 is able to maintain a single RTSP channel with the IP camera 167. Once the IP camera 167 sends the streaming content to the gateway 150, the gateway 150, for example, buffers and distributes the streaming content to one or more mobile devices, such as MD1-MD3. In other words, the gateway 150 is configured to handle multiple requests for content or data from mobile devices external to the home network via multiple communication channels while maintaining a single channel with the respective connected device that is providing the content or data.

For example, at Step M, the RTSP server of the IP camera 167 sends streaming content in UDP packets on the ports 3000-3004 as requested by the RTSP client on the gateway 150 (see Step I) to the gateway 150. The RTSP client on the gateway 150 forwards the UDP packets to the mobile on ports 1000-1004 as requested in the SETUP message of Step E. Since the UDP channel is outside the PCP 126 persistent channel, the streaming content is sent to the public server 125 (Step N), which forwards the content to the mobile device MD1 RTSP client (Step O). The RTSP client under control of the streaming content media player presents the streaming content on a display of the mobile device MD1.

The UDP ports decided by the RTSP client and server are randomly generated and change over time, for security reasons. The gateway hides the IP camera from being exposed on the public network but the HCP layer allows mobile devices to connect and receive content from IP cameras on-demand.

Besides setting up the RTSP channel, the RTSP client-server modules also allow TEARDOWN of the channels. These are typically done in sequence as well. For instance, the mobile device may initiate the teardown with the gateway which in turn may initiate TEARDOWN with the camera. However, if multiple mobile devices are connected to it for receiving the content from a specific IP camera, the gateway may simply teardown the RTSP channel with the specific mobile device.

The above examples describe a system that securely maintains a persistent connection between a user's launched mobile device and a service provider network component that allows the user to communication with their customer connected devices within the user's home network 130 without having to establish and reestablish a communication session through servers without the security features provided by the service provider network 123 components 126 and 125.

Other implementations are also envisioned. For example, a wearable device such as a Fitbit® or the like may be used to indicate a wearer's proximity to a home and the system in response unlocks a door to the home. In more detail, when a user approaches their driveway, their wearable device is configured to provide a signal to the gateway indicating to the gateway to control the connected device associated with the main door to unlock the main door. For example, the lock may be configured to be unlocked once the user's device is within a certain perimeter (e.g., 100 feet) of the house.

In another example, fitness-related wearable devices may be configured to establish a connection to the user's (weight) scale and forward this information to the public server. The public server forwards the scale information to the user's mobile device. A family may have multiple fitness-related wearable devices and each fitness-related wearable device may be configured with names, alerts, and the like specific to the respective user.

Other functionality includes generating a notification to the user that the user has forgotten their mobile device/phone. For example, in the case when the user steps away, such as 100 feet, from their home without their phone, the wearable device may be configured to vibrate for a brief period of time and/or in a certain pattern of vibrations. For example, the wearable device may be configured to vibrate only after the user steps outside a predefined perimeter, such as 50 feet, around the user's house.

Figure 6:
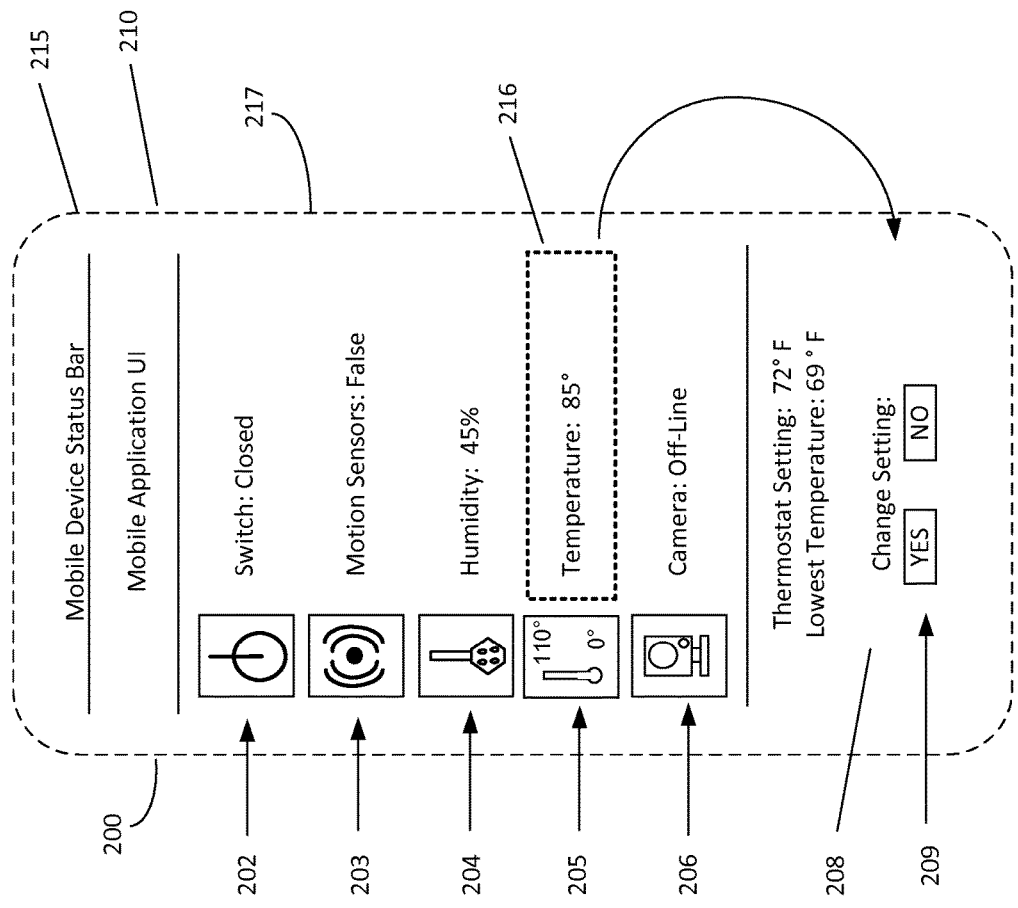
FIG. 6 illustrates an example of a device control application user interface to allow a user to obtain access to customer connected devices at the premises connected to a gateway device according to examples of the disclosed subject matter.
Figure 7:
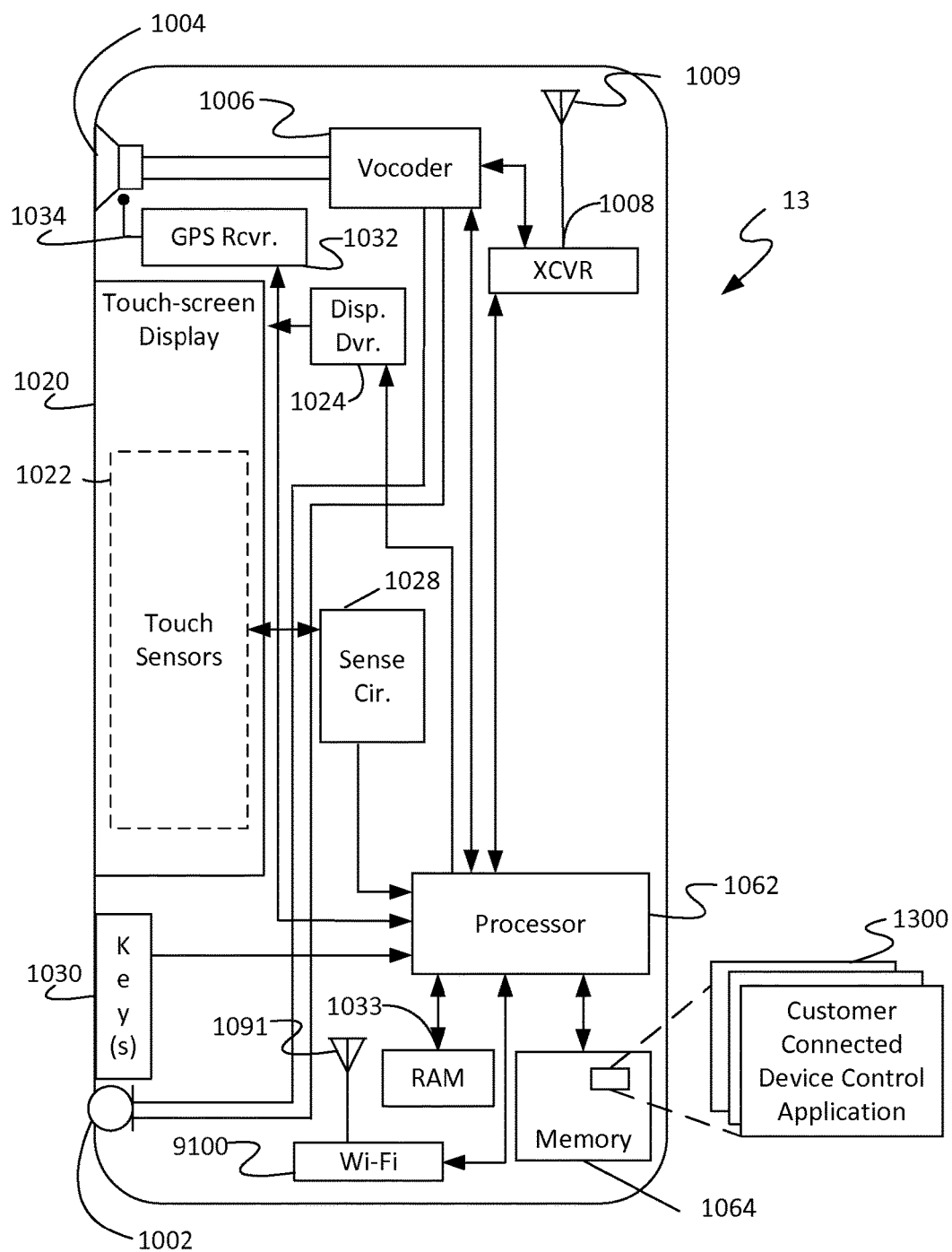
FIG. 7 is a high-level functional block diagram of an example of a touch screen type mobile device that communicates with a gateway device as shown in FIGS. 1 and 4.

FIG. 6 illustrates an example of mobile application user interface according to examples of the disclosed subject matter. For example, the mobile device 200 includes a display device 217. The mobile device 200 display device 217 presents a mobile device user interface 210 and a mobile device status bar 215. The mobile status bar 215 is an area of a mobile device that informs the user of the status of different functions of the mobile device, such as the strength of the cellular connection, whether connected to Wi-Fi or Bluetooth, incoming calls, new e-mails or text messages, the presence of voicemails in a voicemail box, and the like.

The mobile device user interface 210 presents information related to an executing device control application that is configured to interact with the home connect service provided by the service provider and thereby allow a user to control and interact with customer connected devices 161-169 coupled to the gateway 150.

In the present example, the mobile device user interface (UI) 210 is presenting information related to a customer connected device controller application executing on the mobile device 200. The information includes information related to the customer connected devices 161-169 coupled to the gateway 150, and may include status information and the like. For example, the UI 210 presents icons 202-206 representative of a respective customer connected device or a category of customer connected device (e.g., sensors) controlled by the executing customer connected device controller device control application (i.e., controller application).

In the presented example, the presented customer connected device icons include a switch 202, a motion sensor 203, a humidity sensor 204, a thermostat 205 and a camera 206. Also shown, but not required, is a status indicator that is presented adjacent to the respective icons. The status may be provided, if available and/or if set in the user preferences of the device control application. For example, each of the icons 202-206 are shown with status information, such as switch 202 "Switch: Closed;" sensor 203 "Motion Sensors: False;" humidity sensor 204 "Humidity: 45%;" thermostat 205 "Temperature: 85°;" and camera 206 "Camera: Off-Line" adjacent to each in the UI 210.

In an example of the category of customer connected sensors, a user selection of the switch icon 202 results in the presentation of all customer connected switches connected to the gateway 150. Or, in response to a user selection of the motion sensor icon 204, a list of motion sensors that are controllable are presented in the customer connected device notification window 208 of the UI 210. Alternatively, the selection of the motion sensor icon 204 may present a first device in the list to present information related to a respective sensor. In the present example of FIG. 2, the sensor, such as a Zigbee device 165, may be a thermostat 205 and the thermostat 205 settings (e.g., 72 degrees Fahrenheit (F)) may be presented in the customer connected device notification window 208 of the UI 210.

In addition, the controller application may configure a processor (explained in more detail below) to obtain a current room temperature measured by the thermostat, which in the present case indicates 69 degrees F.

Alternatively, in an example, the controller application includes a user preference setting graphical user interface presented in another screen or window of the UI 210 that allows a user to select devices for presentation in the customer connected notification window 208. For example, sensors of interest may be the home thermostat 205, the front door lock, such as switch 202 and a motion detector in the garage, such as motion sensor 203. The user may select a user preference setting to receive a notification in the notification window 208 when the status of any of these three sensors changes. For example, the user may have selected in the user preferences settings window to receive a notification when the thermostat measures a rise in room temperature that approaches the thermostat setting. Alternatively, upon selection of a particular icon, the icon may be highlighted in the UI 210 as indicated by the box 216. In response to the selection, additional status information may include the thermostat settings, such as "72°" and the lowest temperature detected in the past 24 hours, for example. Continuing with the thermostat example, the controller application also presents in the customer connected notification window 208 control inputs 209 that offer a user an opportunity to change the thermostat settings.

The on-demand connections between the customer connected devices 161-169 and the gateway 150 are used not only for purposes of notification, but also for status updates. For example, the status of different devices may change during the course of a day, lights might be turned ON or OFF, appliances may be used or content may be updated on entertainment system, and all of these changes may not be included in the notifications set by the user, stopping the user from being inundated with notifications on the mobile device. However, the PCP 126 receives the status of the devices 161-169 in order to provide up-to-date information to the device control applications when the device control applications launch. As such, when a device control application is not executing on one of the mobile devices MD1-MD3 and, as a result, is not connected to the PCP 126, the persistent connection between the PCP 126 and the gateway 150 is used to transmit the status updates of the customer connected devices 161-169 to the gateway 150. In the example, when the device control application is launched on a mobile device MD1, the device control application communicates with the PCP 126 and acquires updated thermostat information. Also, in response to the launch of the device control application, the gateway 150 communicates with and obtains a temperature value/update from the thermostat. In response to obtaining the temperature value, the gateway 150 posts this update to the PCP 126.

The launched device control application also requests updates from the PCP 126 as and when the updates are available; when the gateway 150 receives the next update from the thermostat it is delivered to the device control application directly via the communication path (i.e., over the UDP port connection) indicated to by the customer connected data arrow in FIG. 1. The delivered update bypasses the PCP 126 and obviates the need for the device control application to poll the PCP 126 which can lead to delays in message delivery and significant battery drain—both of which are undesirable for the mobile device user. As a result, an improvement provided by the described example is the elimination of a need by the device control application executing on the respective mobile device to poll the PCP 126 involves the creation of a new TCP/IP connection over an HTTP; which takes time and may overload the device's resources.

Thus, updates are received by the device control application executing on the respective mobile device as and when the temperature changes. The user can also choose to change the temperature setting in their home via the device control application using the same infrastructure and process as described above by selecting the YES control input 209.

In addition to the notifications provide by the gateway 150 mentioned above, the gateway 150 is also configured to generate an alert. An alert is different from a notification as the system may determine the alerts and the user may determine the notification. In addition, alerts have a higher priority than notifications and updates. The following example describes the difference. For example, a motion sensor bulb that turns ON at 6 pm can be treated as an update (i.e. the turning ON of the bulb likely meaning a family member has come home) whereas a motion sensor bulb that turns on anytime between 9 am and 5 pm can be configured as an Alert—meaning that the motion sensor has been triggered by an intruder or unexpected person. Such an alert is pushed with higher priority than an update by the gateway 150 to the PCP 126 and in turn to the device control application executing on a respective mobile device MD1-MD3. An alert can be configured either on the gateway 150 (via a programming user interface) or on the respective device 161-169, for example, based on the manufacturer's instructions. An advantage of having the alert configured on the gateway 150 is that the programmability of the gateway 150 offers the user a centralized system where the user can add and/or modify alerts as they please, thereby offering greater user choice and flexibility.

Referring back to FIG. 1, mobile device MD3 is shown connected to the data communication network 127 via the access point 128. The mobile device MD3 also is configured to execute the device control application of the service provider to control the respective devices 161-169. When launched the device control application creates a connection with the PCP 126 via the data communication network 127 and the public server 125. Similar to PCP 126 persistent connections made via the MNO communication network 120 to the mobile devices 126, the connection to the PCP 126 by the mobile device MD3 is also persistent but through the public server 125 of the service provider network 123 and the data communication network 127 instead of through the MNO communication network 120.

In an example in which the device control application is executing on a mobile device, such as MD3, and communicates with the PCP 126 via the data communication network 127 and the public server 125, the device control application similarly opens a UDP port for receiving customer connected data (not shown by an arrow) from the gateway 150, and identifies the UDP port by providing a UDP port identifier to the PCP 126. The PCP 126 identifies the UDP port opened by the device control application to the gateway 150. Upon obtaining the UDP port identifier from the PCP 126, the gateway 150 begins communicating with the mobile device MD 3 via the data communication network 127.

As background, the User Datagram Protocol (UDP) is one of the core members of the Internet protocol suite (the set of network protocols used for the Internet). With UDP, computer applications can send messages, in this case referred to as datagrams, to other hosts on an Internet Protocol network without prior communications to set up special transmission channels or data paths. The Internet Protocol (IP) is the principal communications protocol in the Internet protocol suite for relaying datagrams across network boundaries. Its routing function enables internetworking, and essentially establishes the Internet.

Other examples are also realized with the above described solutions using a wearable device such as bracelet or watch. For example, when a user approaches their drive way, their wearable device communicates via the MNO communication network 120 or even the user's home Wi-Fi network to the gateway 150 that the user is within a certain proximity to the user's home. In response to receiving the indication, the gateway 150 can signal the door lock on the main door to unlock. In other words, the lock can be configured to be unlocked once the user's device is within a certain perimeter of the house.

In another example, the system 100 also provides a notification to a user if they have forgotten their mobile device/phone at home. For example, the mobile device/phone may be registered as a customer connected device with the gateway 150. According to user preference settings, the user may set a notification to notify the user that the user has left the house without the mobile device/phone. If the user happens to leave their home and travels a predefined distance from the home without their registered mobile device/phone, the wearable device is configured to vibrate as a form of notification.

Of course, other examples are envisioned that utilize user preference settings and the functionality described in the foregoing examples and as recited in the following claims, but for the sake of brevity are not disclosed.

The present examples provide advantages and improvements over the applied prior art. Although all of the advantages and improvements may not be provided by every example, each example provides at least one advantage or improvement over the prior art. For example, some of the described examples provide a unified solution allows the user to easily control disparate devices in an on-demand, plug-and-play fashion. In addition, the user can access actionable data on their device of choice (i.e., smartphones or tablets) over the MNO communication network (i.e., cellular) network in near-real time. Also, the Persistent Connection Platform employed in the described solutions ensure minimal communication delays with acceptable quality of service (QOS) between the device control application executing on the mobile device and the customer connected devices. Additionally, any sensitive user data (such as a video stream) that is transmitted over the public internet is transmitted in an encrypted format with enhanced security measures available through the service provider that mitigates the threat of unauthorized access to any of the data and/or the control of the customer connected devices.

At this time, it may be useful to consider, at a high level, the functional elements/aspects of the UE 310 and the PPI manager in more detail. FIG. 3 provides a block diagram illustration of an example of touch-screen type mobile device 13. Although shown as a handheld smartphone for discussion purposes, mobile device 13 may also be a tablet or may be incorporated into another device, such as a tablet, wearable device, a personal digital assistant (PDA) or the like. The mobile device 13 functions as a normal digital wireless telephone device. For that function, the device 13 includes a microphone 1002 for audio signal input and a speaker 1004 for audio signal output. The microphone 1002 and speaker 1004 connect to voice coding and decoding circuitry (vocoder) 1006. For a voice telephone call, for example, the vocoder 1006 provides two-way conversion between analog audio signals representing speech or other audio and digital samples at a compressed bit rate compatible with the digital protocol of wireless telephone network communications or voice over packet (i.e. Internet Protocol) communications.

For digital wireless communications, the handset 13 also includes at least one digital transceiver (XCVR) 1008. Today, the handset 13 is configured for digital wireless communications using one or more of the common network technology types. In an example, the XCVR 1008 is configured as a transceiver suitable data (which includes voice) communications over different types of radio access networks and/or mobile communication networks, such as a long term evolution (LTE) network according to any standards or requirements related to VoLTE. The concepts discussed here encompass embodiments of the mobile device 13 utilizing any digital transceivers that conform to current or future developed digital wireless communication standards. The mobile device 13 may also be capable of analog operation via a legacy network technology.

The transceiver 1008 provides two-way wireless communication of information, such as vocoded speech samples and/or digital information for data communications (including for authentication), in accordance with the technology of the networks of FIG. 1. The transceiver 1008 also sends and receives a variety of signaling messages in support of the various voice and data services provided via the mobile device 13 and the communication network. Each transceiver 1008 connects through RF send and receive amplifiers (not separately shown) to an antenna 1009.

A microprocessor 1062 serves as a programmable controller for the mobile device 13, in that it controls all operations of the mobile device 13 in accord with programming that it executes, for all normal operations, and for operations involved in the device connect mobile application customer connected device control service under consideration here. A microprocessor, or generally, a processor, is a hardware circuit having elements structured and arranged to perform one or more processing functions, typically various data processing functions. Although discrete logic components could be used, the examples utilize components forming a programmable central processing unit (CPU). A microprocessor for example includes one or more integrated circuit (IC) chips incorporating the electronic elements to perform the functions of the CPU. The microprocessor 1062, for example, may be based on any known or available microprocessor architecture, such as a Reduced Instruction Set Computing (RISC) using an ARM architecture, as commonly used today in mobile devices and other portable electronic devices. Of course, other microprocessor circuitry may be used to form the CPU or processor hardware in server computers or other user terminal computer equipment.

The microprocessor 1062 serves as the programmable host for mobile device 13 by configuring the mobile device 13 to perform various operations, for example, in accordance with instructions or programming executable by microprocessor 1062. For example, such operations may include various general operations of the mobile device 13 as well as operations related to confirming or adjusting operational settings of the mobile device 13, contacting network devices, storing user preference information, controlling encoding/decoding of voice and video data, and the like. Although a processor may be configured by use of hardwired logic, typical processors in mobile devices are general processing circuits configured by execution of programming. The microprocessor 1062 connects to other elements of the mobile device 13 via appropriate circuitry, such as bus or terminal connections. In a present example, the mobile device 13 includes flash type program memory 1064, for storage of various "software" or "firmware" program routines such as device operating system (OS), voice encoding/decoding algorithms, video encoding/decoding algorithms, programs related to graphical user interface elements and functions. The memory 1064 also stores mobile configuration settings, such as the MDN, the IMEID and/or mobile identification number (MIN), etc. The mobile device 13 may also include a non-volatile random access memory (RAM) 1033 for a working data processing memory. Of course, other storage devices or configurations may be added to or substituted for those in the example. The memories 1064, 1033 also store various data, such as telephone numbers and server addresses, downloaded data such as multimedia content and applications, and various data input by the user. Programming stored in the flash type program memory 1064, sometimes referred to as "firmware," is loaded into and executed by the microprocessor 1062. For example, the customer connected device control application code is stored in the memory 1064.

As outlined above, the mobile device 13 includes a processor, and programming, such as mobile application(s) 1030, stored in the memory 1064 configures the processor so that the mobile device is capable of performing various desired functions, including in this case the functions involved in the technique for providing revisions to the discontinuous reception settings of the mobile device 13. The logic implemented by the processor 1062 of the mobile device 13 configures the processor 1062 to control various functions as implemented by the mobile device 13. The logic for a processor 1062 may be implemented in a variety of ways, but in our example, the processor logic is implemented by programming for execution by the processor 1062. Regular operations of the device are controlled by operation of the processor 1062. Mobile applications, such as the customer connected device control application, 1300 may be stored in flash memory 1064 as well as other applications (e.g., games, productivity, entertainment (video and/or audio), voice and the like).

The mobile device 13 includes a touch-screen display 1020 for displaying messages, menus or the like, call related information dialed by the user, calling party numbers, etc., including the graphical user interface 217 of FIG. 2. Keys 1030 or a virtual keyboard presented via the touch-screen display 1020 may enable dialing digits for voice and/or data calls as well as generating selection inputs, for example, as may be keyed-in by the user based on a displayed menu or as a cursor control and selection of a highlighted item on a displayed screen. The touch-screen display 1020 and keys 1030 are the physical elements providing a textual or graphical user interface. Various combinations of the keypad 120, touch-screen display 1020, microphone 1002 and speaker 1004 may be used as the physical input output elements of the graphical user interface (GUI), for multimedia (e.g., audio and/or video) communications including communications/interactions related to voice and/or video calling. Of course other user interface elements may be used, such as a trackball, as in some types of PDAs or smart phones.

In addition to normal telephone and data communication related input/output, the user interface elements also may be used for display of menus and other information to the user and user input of selections, including any needed during user selection of a menu option. For example, if used as a selection device, the user interface elements allow a user to input information or make setting selections via, for example, interactions with the enabled customer connected device control application, related to the user's usage of the devices 161-169 and the gateway 150.

For input purposes, touch screen display 1020 includes a plurality of touch sensors 1022. Other interface elements may include a keypad including one or more keys 1030. For example, the keypad may be implemented in hardware as a T9 or QWERTY keyboard of mobile device 13 and keys 1030 may correspond to the physical keys of such a keyboard. Alternatively, keys 1030 (and keyboard) of mobile device 13 may be implemented as "soft keys" of a virtual keyboard graphically represented in an appropriate arrangement via touch screen display 1020. The soft keys presented on the touch screen display 1020 may allow the user of mobile device 13 to invoke the same user interface functions as with the physical hardware keys. In some implementations, the microphone 1002 and speaker 1004 may be used as additional user interface elements, for audio input and output, including with respect to some functions related to the video calling processing and communication, as described herein. The different user interface elements may be used to navigate through the examples of video calling service graphical user interfaces described herein.

For output, touch screen display 1020 is used to present information (e.g., text, video, graphics or other visible digital media content) to the user of mobile device 13. Processor 1062 controls visible display output on the LCD or other display element of the touch screen display 1020 via a display driver 1024, to present the various visible outputs to the device user.

In general, touch screen display 1020 and touch sensors 1022 (and one or more keys 1030, if included) are used to provide the textual and graphical user interface for the mobile device 13. In an example, touch screen display 1020 provides viewable content to the user at mobile device 13. Touch screen display 1020 also enables the user to interact directly with the viewable content provided in the content display area, typically by touching the surface of the screen with a finger or an implement such as a stylus.

As shown in FIG. 3, the mobile device 13 also includes a sense circuit 1028 coupled to touch sensors 1022 for detecting the occurrence and relative location/position of each touch with respect to a content display area of touch screen display 1020. In addition, the sense circuit 1028 is configured to provide processor 1062 with touch-position information based on user input received via touch sensors 1022 (e.g. a user interface element). In some implementations, processor 1062 is configured to correlate the touch position information to specific content being displayed within the content display area on touch screen display 1020. The touch-position information captured by sense circuit 1028 and provided to processor 1062 may include, but is not limited to, coordinates identifying the location of each detected touch with respect to the display area of touch screen display 1020 and a timestamp corresponding to each detected touch position.

There are a variety of ways that a mobile device 13 may be configured to obtain information with respect to current location of the device. In our example, the mobile device 13 includes a global positioning satellite (GPS) receiver 1032 and associated antenna 1034. Location information, in some examples, trigger the device control application to generate commands to the respective devices 161-169. For example, the GPS receiver 1032 provides location information indicating that the mobile device 13 is within a predetermined distance of the user's home. In response to the location information indicating the predetermined distance, the device control application according to user preferences and/or settings generates a command to a respective device 161-169 via the gateway 150, for example, to open the garage door and to turn ON the kitchen lights, or perform some other actions.

As known in the data processing and communications arts, a general-purpose computer typically comprises a central processor or other processing device, an internal communication bus, various types of memory or storage media (RAM, ROM, EEPROM, Flash, cache memory, disk drives etc.) for code and data storage, and one or more network interface cards or ports for communication purposes. The software functionalities involve programming, including executable code as well as associated stored data, e.g. files used for the enabled customer connected device profile storage in the examples described herein. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for enabling control of enabled customer connected devices based on a persistent connection maintained by a service provider network component, in essentially the manner performed in the implementations discussed and illustrated herein.

Figure 8:
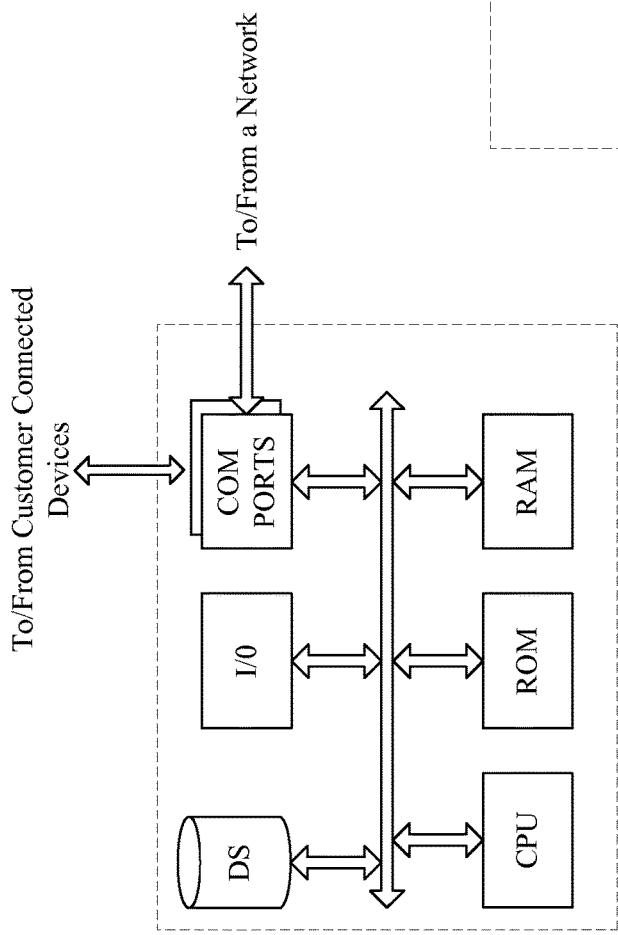
FIG. 8 is a simplified functional block diagram of a computer that may be configured as a host or server, for example, to function as a persistent connection platform, a router, a server or a gateway in the system of FIG. 1.
Figure 9:
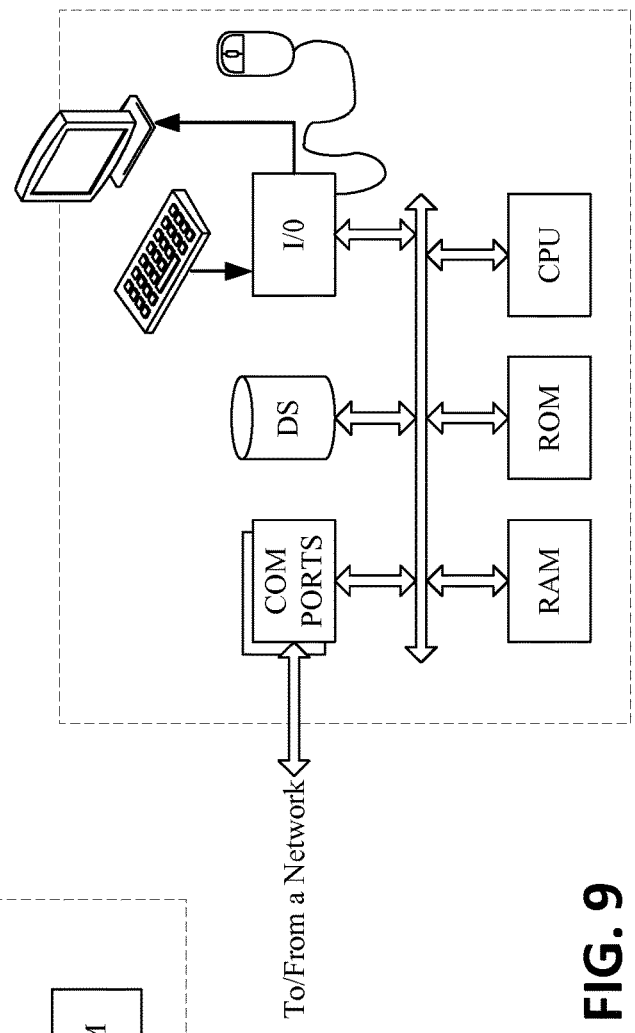
FIG. 9 is a simplified functional block diagram of a personal computer or other work station or terminal device.

FIGS. 8 and 9 provide functional block diagram illustrations of general purpose computer hardware platforms. FIG. 8 illustrates a network or host computer platform, as may typically be used to implement a server, router or gateway device. FIG. 9 depicts a computer with user interface elements, as may be used to implement a personal computer or other type of work station or terminal device, although the computer of FIG. 9 may also act as a server if appropriately programmed, such as gateway 150 or user devices 152 and 154. It is believed that the general structure and general operation of such equipment as shown in FIGS. 8 and 5 should be self-explanatory from the high-level illustrations.

A server, or more specifically, the PCP 126, the home router 140 or gateway 150, for example, includes a data communication interface for packet data communication. For example, the gateway device 150 and the PCP 126 of FIG. 1 are configured to include one or more of the components shown. In addition, the gateway interface 159 of the gateway device 150 may be connected as the input/output (I/O) device, and include multiple connection physical ports or antennas as well as transceivers for connecting networking devices that receive communications (either wired or wireless) according to communication protocols associated with the respective devices 161-169 of the various protocols, such as Zwave, BLE, Zigbee, TCP/IP or other communication protocols. The server, or gateway, also includes a central processing unit (CPU), in the form of one or more processors, for executing program instructions. The server platform typically includes an internal communication bus, program storage and data storage (DS) for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a personal desktop computer or tablet computer or devices like 152 and 154 of FIG. 1, similarly includes a data communication interface CPU, main memory and one or more mass storage devices for storing user data and the various executable programs (see FIG. 9). A mobile device type user terminal may include similar elements, but may typically use smaller components that also require less power, to facilitate implementation in a portable form factor. The various types of user terminal devices may also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

At least some aspects of the methods of enabling the customer connected control service provided by the service provider outlined above may be embodied in programming, e.g. for the mobile device, the connectable device, and/or the provisioning system server. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the provisioning system into the computer platform of a user mobile device or a connectable device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the connectable device provisioning service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer or the like can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A gateway device, comprising:
   a memory for storing instructions;
   a communication interface compatible with a plurality of different communication protocols for interfacing with one or more connected devices,
     the gateway device being connected to a first network, and
     the gateway device having a direct connection with each of the one or more connected devices via the communication interface; and
   a processor, communicably coupled to the memory and the communication interface, to execute the instructions to:
     send a connection request to a service provider device in a service provider network;
     receive a gateway identifier based on sending the connection request;
     establish a connection with the service provider device based on receiving the gateway identifier;
     receive, from the one or more connected devices, a join request;
     assign unique identifiers to the one or more connected devices based on receiving the join request;
     connect to the one or more connected devices based on assigning the unique identifiers;
     receive, from a mobile device and via an application, a command to execute a function on a particular connected device of the one or more connected devices,
       the mobile device being connected to a second network,
       the application being configured to:
         send control commands to the one or more connected devices, and
         receive data from the one or more connected devices, and
       the command including the gateway identifier, a particular unique identifier of the unique identifiers, and a mobile device identifier,
         the particular unique identifier identifying the particular connected device;
     translate instructions in the command to generate translated instructions;
     send the translated instructions to the particular connected device,
       the function being performed by the particular connected device based on the translated instructions, and the function being:
turning on the particular connected device,
turning off the particular connected device, or
changing a setting associated with the particular connected device;
receive, from the particular connected device, an acknowledgement indicating that the function was performed; and
send the acknowledgement to the mobile device.

2. The gateway device of claim 1, wherein the processor is further to:
receive a request for content;
establish a data connection with the mobile device, via a port, based on receiving the request for content; and
transmit data, obtained from the particular connected device, to the mobile device via the established data connection.

3. The gateway device of claim 2, wherein the established data connection with the mobile device is different from the connection with the service provider device.

4. The gateway device of claim 1, wherein the processor is further to:
transmit subscriber-related credentials to the service provider device prior to establishing the connection,
the subscriber-related credentials including at least one of:
a subscriber user name,
a subscriber password, or
an indication that the subscriber is authorized to receive application services; and
receive a request to initiate establishing the connection based on receiving an indication of successful authentication of the subscriber-related credentials.

5. The gateway device of claim 1, wherein the processor is further to:
identify a presence of the particular connected device; and
establish a connection to the particular connected device, via the communication interface, based on identifying the presence of the particular connected device.

6. The gateway device of claim 1, wherein the processor is further to:
receive profile information from the particular connected device; and
send the profile information to the service provider device,
the profile information being used to create a profile of the particular connected device.

7. The gateway device of claim 1, wherein the processor is further to:
send profile information to the service provider device, via the connection, based on obtaining the profile information,
the profile information including the particular unique identifier.

8. The gateway device of claim 1, wherein the service provider device is associated with a network different from the first network.

9. The gateway device of claim 1, wherein the communication interface is compatible with the plurality of different communication protocols associated with information provided via:
wired connection points,
one or more antennas, and
one or more transceivers for exchanging communication signals, corresponding to each of the plurality of different communication protocols, with the one or more connected devices connected via a respective wired connection point, of the wired connection points, and a respective antenna of the one or more antennas, and
wherein the processor is further to:
exchange communications, according to each of the plurality of different communication protocols, over a wired or wireless communication pathway with the one or more connected devices.

10. The gateway device of claim 1, wherein the processor is further to:
receive and decode signals received from the particular connected device, and
encode and transmit signals to the particular connected device.

11. The gateway device of claim 1, wherein the connection request is sent using a hash function.

12. A service provider device, comprising:
a memory for storing instructions; and
a processor, communicably coupled to the memory, to execute the instructions to:
receive a first request for a connection;
send a gateway identifier based on receiving the first request;
establish the connection with a gateway device in a network based on sending the gateway identifier;
receive a second request from a mobile device for content;
send the second request to the gateway device;
establish a user datagram protocol (UDP) connection with the mobile device based on sending the second request;
assign a UDP port identifier to the UDP connection established with the mobile device;
send the UDP port identifier to the gateway device to establish a communication path between the mobile device and the gateway device;
receive, from the mobile device and via an application, a command to execute a function on a particular connected device of one or more connected devices,
the gateway device and the one or more connected devices being associated with a same network,
the gateway device having a direct connection with each of the one or more connected devices,
the mobile device being associated with a different network,
the application being configured to:
send control commands to the one or more connected devices, and
receive data from the one or more connected devices, and
the command including the gateway identifier, an identifier of the particular connected device, and a mobile device identifier;
translate instructions in the command to generate translated instructions;
send, via the gateway device, the translated instructions to the particular connected device,
the function being performed by the particular connected device based on the translated instructions, and
the function being:
turning on the particular connected device,
turning off the particular connected device, or
changing a setting associated with the particular connected device;
receive, from the gateway device, an acknowledgement indicating that the function was performed; and
send the acknowledgement to the mobile device.

13. The service provider device of claim 12, wherein the processor is further to:
receive, from the gateway device and via the connection, a profile of the particular connected device; and
store the profile in the memory.

14. The service provider device of claim 12, wherein the processor is further to:
assign a data transmission identifier to the particular connected device;
receive status updates of the particular connected device; and
store the status updates in the memory according to the data transmission identifier.

15. The service provider device of claim 12, wherein the processor is further to:
maintain the connection after a data communication between the mobile device and the gateway device is established.

16. A method, comprising:
receiving, by a device, a first request for a connection;
sending, by the device, a gateway identifier based on receiving the first request;
establishing, by the device, the connection with a gateway device in a network based on sending the gateway identifier;
receiving, by the device, a second request from a mobile device for content;
sending, by the device, the second request to the gateway device;
establishing, by the device, a user datagram protocol (UDP) connection with the mobile device based on sending the second request;
assigning, by the device, a UDP port identifier to the UDP connection established with the mobile device; and
sending, by the device, the UDP port identifier to the gateway device to establish a communication path between the mobile device and the gateway device;
receiving, by the device and from the mobile device, via an application, a command to execute a function on a particular connected device of one or more connected devices,
the gateway device and the one or more connected devices being associated with a same network,
the gateway device having a direct connection with each of the one or more connected devices,
the mobile device being associated with a different network,
the application:
sending control commands to the one or more connected devices, and
receiving data from the one or more connected devices, and
the command including the gateway identifier, an identifier of the particular connected device, and a mobile device identifier;
translating, by the device, instructions in the command to generate translated instructions;
sending, by the device and via the gateway device, the translated instructions to the particular connected device,
the function being performed by the particular connected device based on the translated instructions, and
the function being:
turning on the particular connected device,
turning off the particular connected device, or
changing a setting associated with the particular connected device;
receiving, by the device and from the gateway device, an acknowledgement indicating that the function was performed; and
sending, by the device, the acknowledgement to the mobile device.

17. The method of claim 16, further comprising:
receiving, from the gateway device and via the connection, a profile of the particular connected device; and
storing the profile in a memory.

18. The method of claim 16, further comprising:
assigning a data transmission identifier to the particular connected device;
receiving status updates of the particular connected device; and
storing the status updates in a memory according to the data transmission identifier.

19. The method of claim 16, further comprising:
maintaining the connection with the gateway device after a data communication between the mobile device and the gateway device is established.

20. The method of claim 16, wherein UDP packets are delivered via the communication path.

* * * * *